United States Patent
Yamamoto

(10) Patent No.: US 11,775,090 B2
(45) Date of Patent: *Oct. 3, 2023

(54) POSITION INDICATOR

(71) Applicant: Wacom Co., Ltd., Saitama (JP)

(72) Inventor: Sadao Yamamoto, Tokyo (JP)

(73) Assignee: Wacom Co., Ltd., Saitama (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/732,241

(22) Filed: Apr. 28, 2022

(65) Prior Publication Data

US 2022/0253156 A1 Aug. 11, 2022

Related U.S. Application Data

(63) Continuation of application No. 17/085,549, filed on Oct. 30, 2020, now Pat. No. 11,347,332, which is a
(Continued)

(51) Int. Cl.
*G06F 3/038* (2013.01)
*G06F 3/046* (2006.01)
(Continued)

(52) U.S. Cl.
CPC ............ *G06F 3/0383* (2013.01); *G06F 3/038* (2013.01); *G06F 3/03545* (2013.01);
(Continued)

(58) Field of Classification Search
CPC ...... G06F 3/038; G06F 3/0383; G06F 3/0354; G06F 3/03541; G06F 3/03542;
(Continued)

(56) References Cited

U.S. PATENT DOCUMENTS 6,005,555 A 12/1999 Katsurahira et al.
8,199,132 B1 6/2012 Oda et al.
(Continued)

FOREIGN PATENT DOCUMENTS

EP 2 172 834 A2 4/2010
EP 2 511 800 A2 10/2012
(Continued)

OTHER PUBLICATIONS

Korean Office Action, dated Jun. 29, 2020, for Korean Application No. 10-2017-7012921, 9 pages. (With English machine translation).
(Continued)

*Primary Examiner* — Tom V Sheng
(74) *Attorney, Agent, or Firm* — Seed IP Law Group LLP

(57) ABSTRACT

A position indicator includes a pen-shaped body; control circuitry housed in the pen-shaped body and configured to generate position detection signals and generate additional information about the position indicator; a first receiver; a second receiver different from the first receiver; a first transmitter provided near a distal end of the pen-shaped body and configured to transmit the position detection signals to a sensor of a position detection system; and a second transmitter, which is different from the first transmitter and configured to transmit wireless signals to the position detection system. The control circuitry, in response to a control signal from the position detection system received by the first receiver or the second receiver, controls transmission of the position detection signals and transmission of the additional information via a transmitter selected from the first transmitter and the second transmitter, to the position detection system.

31 Claims, 15 Drawing Sheets

Related U.S. Application Data continuation of application No. 16/691,393, filed on Nov. 21, 2019, now Pat. No. 10,866,660, which is a continuation of application No. 15/495,347, filed on Apr. 24, 2017, now Pat. No. 10,509,491, which is a continuation of application No. PCT/JP2014/080295, filed on Nov. 17, 2014.

(51) Int. Cl.
  *G06F 3/0354* (2013.01)
  *G06F 3/041* (2006.01)
  *G06F 3/044* (2006.01)

(52) U.S. Cl.
  CPC ............. *G06F 3/044* (2013.01); *G06F 3/046* (2013.01); *G06F 3/0416* (2013.01); *G06F 3/0441* (2019.05); *G06F 3/0445* (2019.05); *G06F 3/0446* (2019.05); *G06F 3/04162* (2019.05); *G06F 3/04166* (2019.05); *G06F 2203/0384* (2013.01)

(58) Field of Classification Search
  CPC ............. G06F 3/03543; G06F 3/03544; G06F 3/03545; G06F 3/03546; G06F 3/03549; G06F 3/0416; G06F 3/04162; G06F 3/04166; G06F 3/044; G06F 3/0441; G06F 3/0445; G06F 3/0446; G06F 3/046; G06F 2203/0331; G06F 2203/038; G06F 2203/0381; G06F 2203/0382; G06F 2203/0383; G06F 2203/0384
  USPC .................................. 345/179, 530
  See application file for complete search history.

(56) References Cited

U.S. PATENT DOCUMENTS

| | | | |
|---|---|---|---|
| 8,487,891 B2 | 7/2013 | Oda et al. | |
| 8,803,850 B2 | 8/2014 | Griffin et al. | |
| 8,913,041 B2 | 12/2014 | Fukushima et al. | |
| 9,268,417 B2 | 2/2016 | Oda et al. | |
| 9,417,738 B2 | 8/2016 | Hargreaves et al. | |
| 9,542,036 B2 | 1/2017 | King-Smith et al. | |
| 10,509,491 B2 * | 12/2019 | Yamamoto | G06F 3/03545 |
| 10,866,660 B2 * | 12/2020 | Yamamoto | G06F 3/0445 |
| 11,347,332 B2 * | 5/2022 | Yamamoto | G06F 3/0416 |
| 2010/0315384 A1 | 12/2010 | Hargreaves et al. | |
| 2011/0155479 A1 * | 6/2011 | Oda | G06F 3/044 178/19.04 |
| 2011/0216032 A1 * | 9/2011 | Oda | G06F 3/046 345/174 |
| 2012/0050231 A1 | 3/2012 | Westhues et al. | |
| 2013/0093725 A1 * | 4/2013 | Reynolds | G06F 3/04182 345/174 |
| 2013/0185640 A1 * | 7/2013 | Gazdzinski | G06Q 30/0254 715/728 |
| 2014/0069532 A1 * | 3/2014 | Obata | G06F 3/046 137/554 |
| 2014/0218280 A1 | 8/2014 | Wang et al. | |
| 2014/0267147 A1 | 9/2014 | Buelow et al. | |
| 2015/0070296 A1 | 3/2015 | Kuo | |
| 2015/0294516 A1 | 10/2015 | Chiang | |
| 2016/0179279 A1 * | 6/2016 | Katsurahira | G06F 3/03545 345/156 |
| 2016/0179280 A1 * | 6/2016 | Katsurahira | G06F 3/041 345/173 |
| 2016/0188008 A1 | 6/2016 | Horie et al. | |
| 2016/0335469 A1 | 11/2016 | Chiang | |
| 2017/0200038 A1 | 7/2017 | Chiang | |
| 2017/0285766 A1 | 10/2017 | Omura | |
| 2017/0285772 A1 * | 10/2017 | Yamamoto | G06F 3/04162 |
| 2018/0101250 A1 * | 4/2018 | Katsurahira | G06F 3/0446 |
| 2021/0048900 A1 | 2/2021 | Yamamoto | |

FOREIGN PATENT DOCUMENTS

| | | |
|---|---|---|
| JP | 7-295722 A | 11/1995 |
| JP | 2010-86542 A | 4/2010 |
| JP | 2011-3035 A | 1/2011 |
| JP | 4683505 B1 | 5/2011 |
| JP | 2011-186803 A | 9/2011 |
| JP | 2012-221304 A | 11/2012 |
| JP | 2013-161307 A | 8/2013 |
| JP | 2014-191380 A | 10/2014 |
| KR | 10-2013-0128380 A | 11/2013 |
| WO | 2012/039837 A9 | 3/2012 |
| WO | 2016/079776 A1 | 5/2016 |

OTHER PUBLICATIONS

Japanese Office Action, dated Apr. 7, 2021, for Japanese Application No. 2020-091818, 4 pages.

* cited by examiner

FIG.2A
FIG.2B
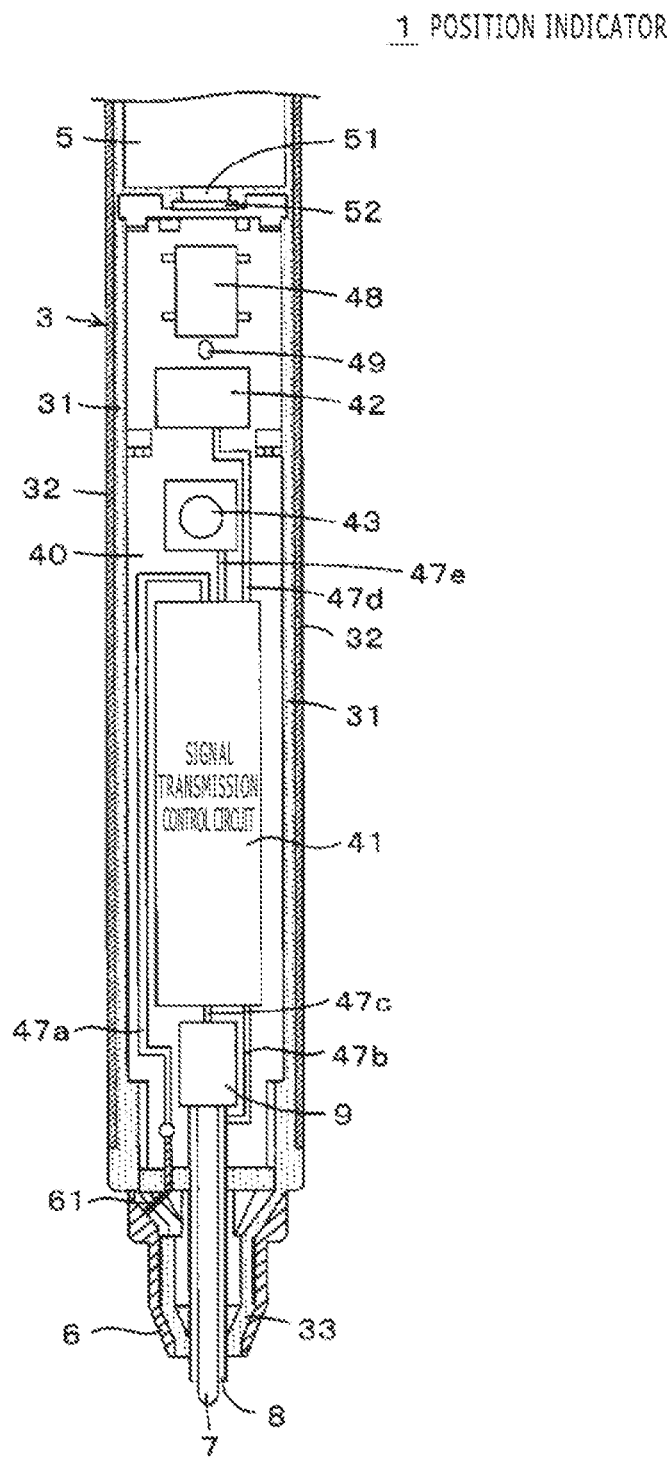
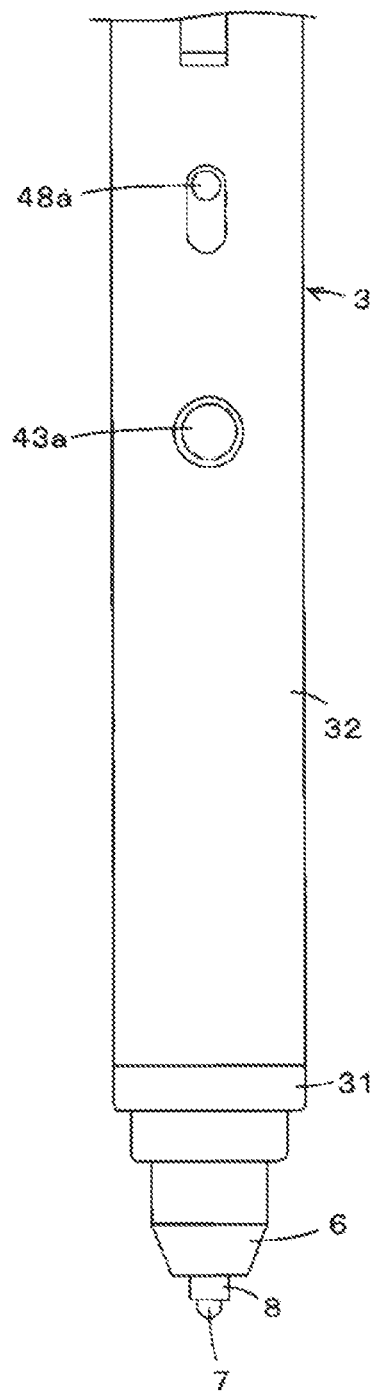

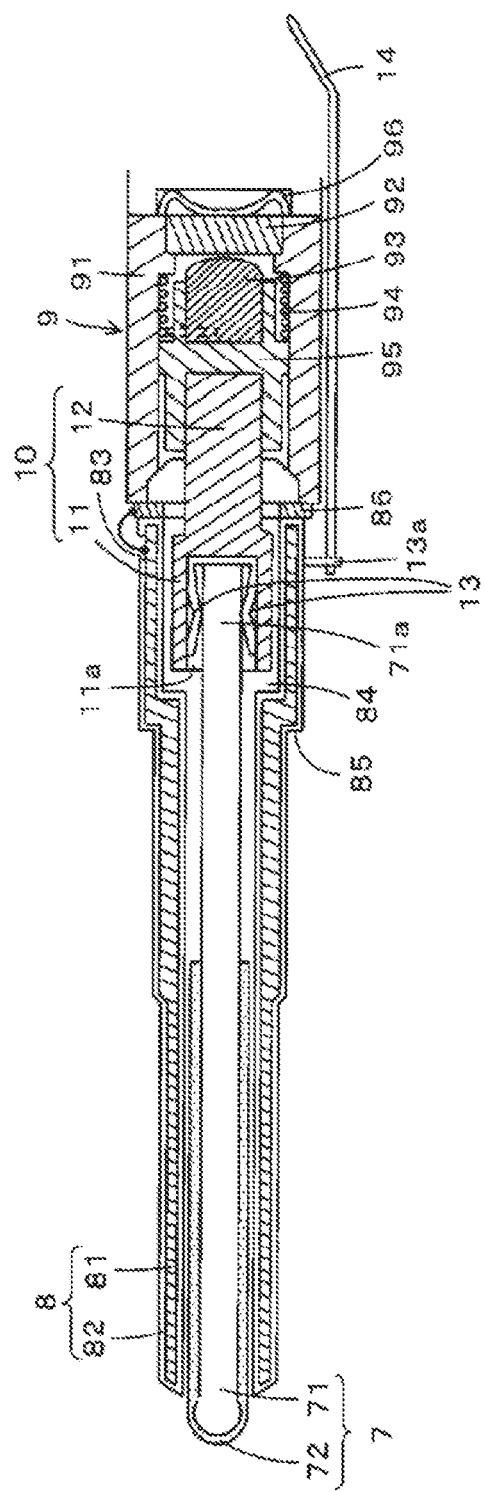

F I G. 5

PEN TYPE TABLE INFORMATION

| | CONFIGURATION TYPE 1 | CONFIGURATION TYPE 2 | CONFIGURATION TYPE 3 | CONFIGURATION TYPE 4 | CONFIGURATION TYPE 5 |
|---|---|---|---|---|---|
| POSITION DETECTING SIGNAL | NO SIGNAL | FROM POSITION DETECTION SYSTEM | CENTER ELECTRODE | CENTER ELECTRODE | CENTER ELECTRODE |
| WRITING PRESSURE INFORMATION | WIRELESS | WIRELESS | WIRELESS | CENTER ELECTRODE | CENTER ELECTRODE |
| SIDE SWITCH INFORMATION | WIRELESS | WIRELESS | WIRELESS | CENTER ELECTRODE | CENTER ELECTRODE |
| IDENTIFICATION INFORMATION ID | WIRELESS | WIRELESS | WIRELESS | WIRELESS | CENTER ELECTRODE |

POSITION INDICATOR

BACKGROUND

Technical Field

The present disclosure relates to a position indicator (stylus) for use with a position detection sensor.

Description of Related Art

As a position inputting apparatus configured from a position detection sensor and a position indicator called electronic pen, various position inputting apparatuses of various schemes such as, for example, an electromagnetic coupling scheme and a capacitive coupling scheme are available depending upon a difference in coupling scheme between the position detection sensor and the electronic pen.

Further, even for position inputting apparatuses of a same scheme, various configuration types are available depending upon a difference in an exchanging method of a position detecting signal between the position detection system and the position indicator and a method for exchanging additional information such as manipulation information of a switch provided on the position indicator, writing pressure information, identification information of the position indicator, and internal storage data or for exchanging instruction information for changing an action of the position indicator. Conventionally, a position indicator compatible with a position detection system is provided to users !imitatively by a method of a specific position detecting signal and a method of exchanging additional information. Therefore, since it is necessary for a user to have position indicators for exclusive use for position inputting apparatus which include position detection systems having similar position detection sensor means, it is necessary for the user to carry a plurality of position indicators and select an appropriate position indicator for each of position inputting apparatus.

For example, as a position indicator of the capacitive coupling scheme, such a plurality of configuration types as described below are available. In particular, a position indicator of a first configuration type is a position indicator of a scheme (passive scheme) wherein the position indicator does not send out a position detecting signal but AC (Alternating Current) electric field energy sent out from a sensor circuit of the position detection system flows to the earth (ground) through the position indicator and a human body to detect a variation of energy (or a voltage) induced in a conductor of the sensor circuit of the position detection system at a position at which the position indicator exists to detect the position (refer, for example, to Patent Document 1 (Japanese Patent Laid-Open No. 2011-3035)).

Meanwhile, a position indicator of a second configuration type of the capacitive coupling scheme is a position indicator of a scheme (improved type of the passive scheme) which is an improvement of the first configuration type described above, which is low in sensitivity in position detection, and which receives a signal from the sensor circuit of the position detection system, performs signal processing such as signal enhancement of the received signal and feeds back the processed signal to the sensor circuit (refer, for example, to Patent Document 2 (Japanese Patent No. 4683505)). In the case of the position indicators of the first and second configuration types, additional information is transmitted or exchanged to the position detection sensor using, for example, wireless communication means.

A position indicator of a third configuration type of the capacitive coupling scheme is a position indicator of an active scheme in which, different from those of the first and second configuration types described above, the position indicator includes a sending circuit and an outgoing signal from the sending circuit is supplied as a position detecting signal to the position detection sensor (refer, for example, to Patent Document 3 (Japanese Patent Laid-Open No. 1995-295722)). The position detection system uses a sensor panel of position detection means and performs position detection of a position indicated by the position indicator from signal strengths of individual conductors by which the outgoing signal from the position indicator of the active scheme is received.

Further, position indicators of the third configuration type are further divided into a plurality of types including a configuration type in which additional information is sent to and received from the position detection system together with a position detecting signal and another configuration type in which part of the additional information is sent and received together with a position detecting signal and the remaining additional information is transmitted separately to a wireless communication means provided in the position detection system through a wireless communication means.

It is to be noted that, although a detailed description is omitted, also in the position indicator of the electromagnetic coupling scheme, a plurality of configuration types are available including a configuration type in which a signal from the sensor circuit of the position detection system is received by a resonance circuit and the received signal is fed back to the sensor circuit of the position detection system, another configuration type in which a sending circuit is provided and an outgoing signal from the sending circuit is transmitted to the sensor circuit of the position detection system through a resonance circuit, and a further configuration type in which additional information is transmitted to a wireless communication means provided in the position detection system, similarly as in the case of the capacitive coupling scheme described hereinabove.

PRIOR ART DOCUMENTS PATENT DOCUMENTS

Patent Document 1: Japanese Patent Laid-Open No. 2011-3035

Patent Document 2: Japanese Patent No. 4683505

Patent Document 3: Japanese Patent Laid-Open No. H07-295722

BRIEF SUMMARY

Technical Problems

Incidentally, even for position inputting apparatuses of the same capacitive coupling scheme or electromagnetic induction scheme, if the configuration type is different, a position indicator corresponding to the configuration type must conventionally be prepared as described hereinabove. However, that a position indicator must be prepared for every different configuration type in such a manner described above imposes a burden on the user in terms of the cost, and the user must manage position indicators of a plurality of configuration types in a coordinated relationship with position detection systems, which is cumbersome.

It is an object of the present disclosure to solve the foregoing problems and provide a position indicator by which a plurality of configuration types can be utilized.

Technical Solution

In order to solve the problems described above, according to the present disclosure, there is provided a position indicator, including: a first transmitter; a second transmitter; an circuit input circuit which, in operation, accepts an input from outside of the position indicator; a signal generation circuit which, in operation, generates a position detecting signal; a plurality of additional information circuits which, in operation, generate a plurality of types of additional information; and a controller which, in operation, controls, based on the input accepted by the input circuit, transmission of the position detecting signal through the first transmitter and controls, based on the input accepted by the input circuit, transmission of additional information from the plurality of additional information generation circuits from the first transmitter or the second transmitter.

In the position indicator according to the present disclosure having the configuration described above, on the basis of an input accepted by the input circuit, the controller (e.g., microprocessor) controls transmission of a position detecting signal through the first transmitter and controls transmission of additional information from the plurality of additional information generation circuit from the first transmitter or second transmitter.

Consequently, the position indicator according to the present disclosure can configure itself as a plurality of types of position indicators compatible with position detection systems of various configuration types (modes).

Advantageous Effect

Since the position indicator according to the present disclosure can adopt, in response to a configuration type of a position detection system, a configuration (mode) suitable for the configuration type, the necessity for preparing a position indicator for each of position detection systems of different configuration types is eliminated, and the burden on the user in terms of cost can be reduced. Further, since only it is necessary for the user to obtain a single position indicator common to a plurality of position detection systems of different configuration types, an advantageous effect that the necessity for complicated management corresponding to position detection systems is eliminated can be achieved.

BRIEF DESCRIPTION OF THE DRAWINGS

FIGS. 2A and 2B are views depicting an example of a mechanical configuration of a position indicator according to an embodiment of the present disclosure.

FIG. 3 is a sectional view depicting an example of a detailed configuration of part of a mechanical configuration of a position indicator according to an embodiment of the present disclosure.

FIG. 5 is a view depicting part of an example of a conceptual configuration of a position indicator according to an embodiment of the present disclosure.

DETAILED DESCRIPTION OF THE PREFERRED EMBODIMENTS DISCLOSURE

Figure 1:
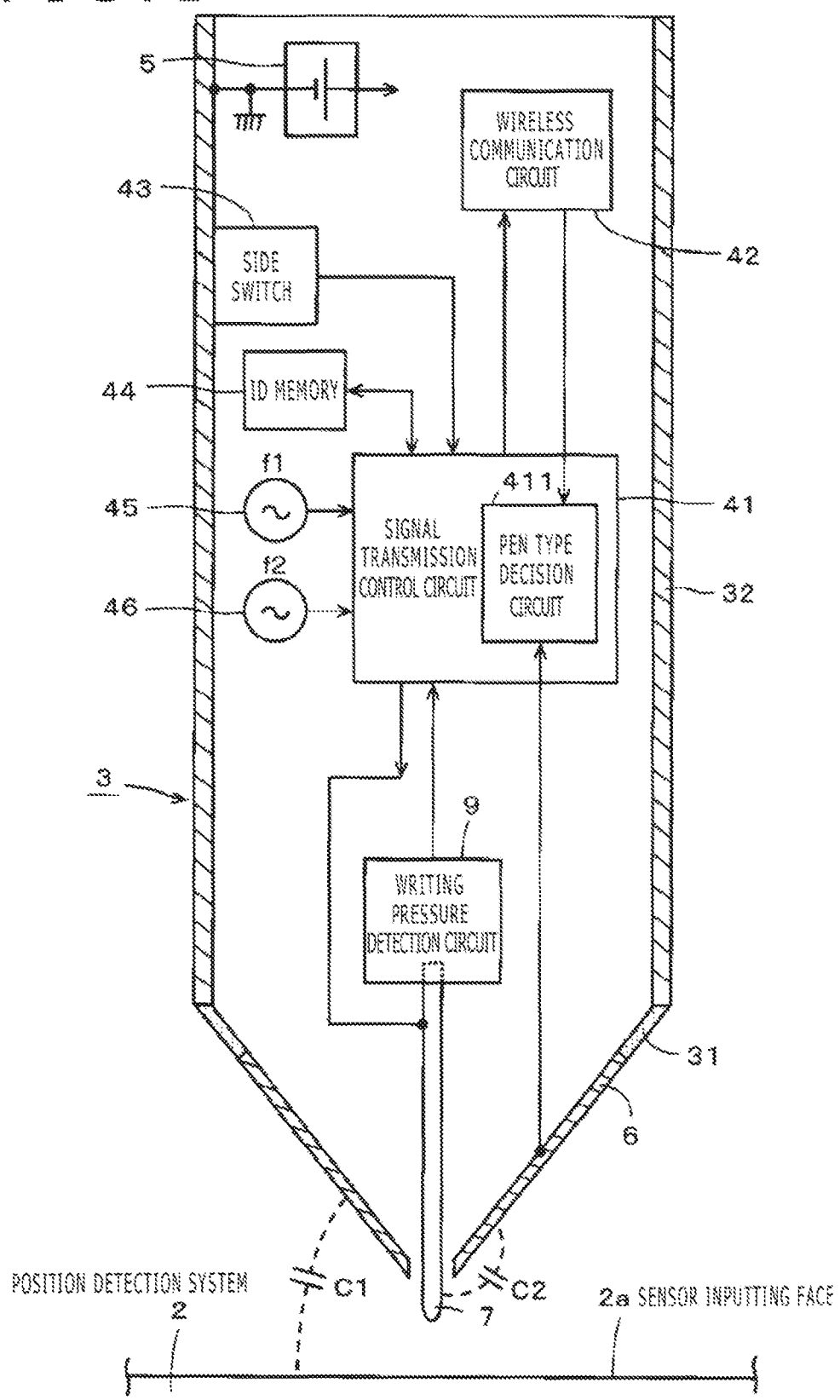
FIG. 1 is a view depicting a configuration of a position indicator according to an embodiment of the present disclosure.

In the following, embodiments of the position indicator according to the present disclosure are described with reference to the drawings. FIG. 1 is a view generally depicting a conceptual configuration of a position indicator 1 of an embodiment of the present disclosure and processing actions of the same and is a view illustrating a state in which the position indicator 1 is positioned on a sensor inputting face 2*a* of a position detection system 2 of the capacitive type. Meanwhile, FIGS. 2A and 2B are views depicting an example of a mechanical configuration of the position indicator 1. More particularly, FIG. 2A is a partial longitudinal sectional view of the position indicator 1 and FIG. 2B is a view depicting part of an appearance of the position indicator 1. In the present embodiment, the position indicator 1 is formed such that an appearance thereof has a bar-like stylus shape.

[Description of Example of Mechanical Configuration of Position Indicator of Embodiment]

The position indicator 1 of the present embodiment includes a bar-like housing 3. This housing 3 is configured from an insulator portion 31 of a hollow cylindrical shape made of an insulating material or a synthetic resin as depicted in FIG. 2A. Further, in the present embodiment, at least a portion of an outer circumferential face of the insulator portion 31 of the housing 3 at which an operator is to grasp the position indicator 1 is covered with a conductor portion 32 made of, for example, a metal.

In the housing 3, a printed wiring board 40, a battery 5 and a writing pressure detection circuit 9 are disposed as depicted in FIG. 2A. The conductor portion 32 which covers an outer circumferential face of the housing 3 is electrically connected, though not depicted, to a grounding conductor of the printed wiring board 40.

On the printed wiring board 40, a signal transmission control circuit 41 configuring an example of a controller, a wireless communication circuit 42, a side switch 43 formed from a pushbutton switch, an ID (Identification) memory 44 in which identification information (ID) of the position indicator 1 is stored, oscillators 45 and 46 which output oscillation signals of frequencies f1 and f2 different from each other, and wire patterns such as conductor patterns 47a to 47e as well as, in the present example, a power supply switch 48 and an LED (Light Emitting Diode) 49 and so forth are disposed as depicted in FIGS. 1 and 2A. It is to be noted that, while, in FIG. 2A, each of the conductor patterns 47a to 47e is schematically depicted as a single conductor pattern for simplified illustration, each of the conductor patterns 47a to 47e may naturally be formed from a plurality of conductor patterns as occasion demands.

The battery 5 is a supplying source of power to electronic circuits and electronic parts configured on the printed wiring board 40. The writing pressure detection circuit 9 is configured, in the present embodiment, as a variable capacitor which indicates a capacitance according to a writing pressure applied to a center electrode 7 which configures the core member as hereinafter described.

The wireless communication circuit 42 has a transmission circuit which makes an example of a transmitter (second transmitter) of additional information of the present disclosure and a reception circuit which makes an example of a receiver (first receiver) for receiving a signal from the position detection system and is configured, in the present embodiment, as a wireless communication circuit that performs wireless communications according to a defined communication protocol associated with the Bluetooth (registered trademark) standard, which is a short-distance wireless communication standard. The wireless communication circuit 42 is connected to the signal transmission control circuit 41. It is to be noted that the wireless communication circuit 42 is not limited to a Bluetooth circuit but may be a circuit by, for example, infrared communication, or a wireless communication circuit of the Wi-Fi (registered trademark) standard may be used.

The side switch 43, ID memory 44 and writing pressure detection circuit 9 individually configure an additional information generation circuit. The side switch 43 supplies on or off information thereof as an example of additional information to the signal transmission control circuit 41. The ID memory 44 outputs identification information (ID) of the position indicator 1 stored therein to the signal transmission control circuit 41 as an example of additional information in response to a reading out request from the signal transmission control circuit 41. The variable capacitor configured from the writing pressure detection circuit 9 exhibits a capacitance variation in response to a writing pressure value applied to the center electrode 7 configuring the core member, and the signal transmission control circuit 41 generates writing pressure information as an example of additional information on the basis of the capacitance of the variable capacitor.

The oscillators 45 and 46 generate an AC signal for forming a position detecting signal to be transmitted from the position indicator 1 of the present embodiment and supplies the generated AC signal to the signal transmission control circuit 41. In the present embodiment, the oscillator 45 generates an AC signal of the frequency f1, and the oscillator 46 generates an AC signal of the frequency f2, which is different from the frequency f1. The signal transmission control circuit 41 generates different position detecting signals on the basis of the oscillator 45 and the oscillator 46. In short, the signal transmission control circuit 41 cooperates with the oscillator 45 and the oscillator 46 to configure a position detection signal generation circuit and configure two signal sending circuits. Then, the signal transmission control circuit 41 determines one of the two different position detecting signals generated thereby as a position detecting signal to be transmission from the position indicator 1. It is to be noted that, in place of the oscillators 45 and 46, a plurality of signal sending circuits which generate and send position detecting signals for a plurality of position indicators of different configuration types of the active scheme hereinafter described may be provided such that they are selectively controlled by the signal transmission control circuit 41.

Further, in the present embodiment, the battery 5 is configured so as to be accommodated in the housing 3 in such a manner as depicted in FIGS. 1 and 2A, and a power supply voltage for electronic circuit circuits such as the signal transmission control circuit 41 on the printed wiring board 40 is generated by the battery 5. In FIG. 2A, a terminal 52 is a terminal electrically connected to a power supply circuit on the printed wiring board 40. A positive side electrode 51 of the battery 5 contacts with and is electrically connected to the terminal 52. Though not depicted, a negative side electrode of the battery 5 is directly connected to a grounding conductor of the printed wiring board 40 or is pressed against and contacts with an elastically displaceable terminal which is connected to the grounding conductor of the printed wiring board 40 through the conductor portion 32 of the housing 3.

An operation element 48a of the power supply switch 48 disposed on the printed wiring board 40 is provided for manual operation from the outside through an opening provided in the housing 3 as depicted in FIG. 2B. The user can switch the power supply switch 48 on or off by slidably moving the operation element 48a. It is to be noted that, although a power supply circuit for generating a power supply voltage from the voltage from the battery 5 when the power supply switch 48 is switched on is formed on the printed wiring board 40, it is omitted for simplified description in FIGS. 1 and 2A.

One end portion side in a center line (e.g., central axis) direction of the insulator portion 31 of the hollow cylindrical shape which configures the housing 3 is formed as a tapered portion 33 which tapers gradually as depicted in FIG. 2A. A peripheral electrode 6 formed, for example, from an annular conductor metal is attached to the outer circumference side of the tapering portion 33. The peripheral electrode 6 and the conductor portion 32 on the outer circumferential face of the housing 3 are isolated from each other because the insulator portion 31 is interposed between them.

The peripheral electrode 6 capacitively couples to the position detection system 2 as schematically depicted in FIG. 1 to configure, in the present embodiment, a reception circuit (second receiver) of a signal from the position detection system. Further, the peripheral electrode 6 is electrically connected to the conductor pattern 47a of the printed wiring board 40 by a lead conductor member 61 which extends through the insulator portion 31. The conductor pattern 47a is connected, in the present example, to an input end of the signal transmission control circuit 41.

Further, in the present embodiment, the center electrode 7 configured from a bar-like member having conductivity is disposed such that one end side thereof projects to the outside from the hollow portion of the tapering portion 33 of the housing 3. This center electrode 7 serves as the core member which configures a pen tip of the pen-shaped position indicator 1.

The center electrode 7 configures, in the present embodiment, a first transmitter that transmits a position detecting signal, and is configured such that an end portion thereof on the side opposite to the side on which the center electrode 7 projects to the outside is electrically connected to the conductor pattern 47b formed on the printed wiring board 40. The conductor pattern 47b is connected to an output terminal of the signal transmission control circuit 41. It is to be noted that, in the present embodiment, the position indicator 1 acts also as a position indicator of the passive scheme which does not send out a position detecting signal, and in this case, the center electrode 7 plays a role in receiving electric charge from the conductor of the position detection system 2 through an capacitive coupling portion.

The peripheral electrode 6 is provided around the center electrode 7. The combination of the peripheral electrode 6 and the center electrode 7 is for a position indicator of the improved type of the passive scheme described hereinabove. In the present embodiment, between the peripheral electrode 6 and the center electrode 7, a shield member 8 for effectively preventing electric interference between them is provided. The shield member 8 in the present embodiment is provided in such a manner as to surround the center electrode 7, and consequently, the shield member 8 is interposed between the peripheral electrode 6 and the center electrode 7 to make the coupling capacitance between the peripheral electrode 6 and the center electrode 7 as low as possible.

The center electrode 7 as the core member is fitted at an end portion thereof on the side opposite to the side on which the center electrode 7 projects to the outside with the writing pressure detection circuit 9 disposed in the hollow portion of the housing 3 to lock the center electrode 7 in the hollow portion of the housing 3 of the position indicator 1. It is to be noted that, as hereinafter described, the center electrode 7 is configured such that the fitting thereof with the writing pressure detection circuit 9 is canceled by pulling out the center electrode 7. In other words, the center electrode 7 as the core member is exchangeable with respect to the position indicator 1.

The writing pressure detection circuit 9 is configured, in the present example, from a variable capacitor (refer, for example, to Japanese Patent Laid-Open No. 2011-186803) which exhibits a capacitance according to a pressure (writing pressure) applied to the center electrode 7 as the core member. Electrodes at the opposite ends of the variable capacitor configured from the writing pressure detection circuit 9 are connected to the signal transmission control circuit 41, in FIG. 2A, through the conductor pattern 47c.

The signal transmission control circuit 41 performs determination control, on the basis of information received from the outside through the wireless communication circuit 42 or information received through the peripheral electrode 6, to which one of a plurality of configuration types (modes) the position indicator 1 of the present embodiment is to be set. Further, the signal transmission control circuit 41 controls, on the basis of the determination control, transmission of a position detecting signal through the center electrode 7 and further controls transmission of additional information through the center electrode 7 or the wireless communication circuit 42.

Now, a detailed configuration of a portion including the center electrode 7, shield member 8 and writing pressure detection circuit 9 is described with reference to FIG. 3. FIG. 3 depicts a cross sectional view of a portion including the center electrode 7, shield member 8 and writing pressure detection circuit 9.

The center electrode 7 includes, as depicted in FIG. 3, a core member 71 made of a conducive material, for example, a metal and formed with a diameter of, for example, 1.9 mm, and is, in the present embodiment, covered with a protective member 72 that extends on approximately half of the pen tip side of the core member 71 and is made of an insulating material. The protective member 72 plays a role of preventing the sensor inputting face 2a of the position detection system 2 from being damaged and increasing the contact area with the sensor inputting face 2a and another role of further strengthening the isolation of the shield member 8 and the peripheral electrode 6 from each other.

As depicted in FIG. 3, the shield member 8 is configured in the present embodiment such that a tubular member 81 configured from a conductive material is covered over an overall surface including an outer wall face and an inner wall face thereof with an insulating layer 82.

The writing pressure detection circuit 9 is configured as a variable capacitor whose capacitance varies in response to a writing pressure applied to the center electrode 7 and acting upon the center electrode 7 through a pressure transmission member 10. As depicted in FIG. 3, the center electrode 7 and the pressure transmission member 10 are coupled to each other and accommodated in a slidably movable state in the hollow portion of the tubular member 81 of the shield member 8. The pressure transmission member 10 has a core member fitting portion 11 into which an end portion 71a of the core member 71 of the center electrode 7 is to be fitted, and a projection 12 which fits with the writing pressure detection circuit 9.

Further, in a recessed portion 11a of the pressure transmission member 10, a terminal piece 13 for establishing electric connection between the center electrode 7 and the signal transmission control circuit 41 of the printed wiring board 40 is disposed as depicted in FIG. 3, and an extension 13a from the terminal piece 13 is connected to a lead electrode 14 connected to the conductor pattern of the printed wiring board 40.

The core member 71 of the center electrode 7 is inserted (force fitted) at an end portion 71a thereof with the terminal piece 13 in the recessed portion 11a of the core member fitting portion 11 of the pressure transmission member 10 so as to be coupled to the pressure transmission member 10, and a writing pressure applied to the core member 71 is transmitted to the writing pressure detection circuit 9 hereinafter described through the pressure transmission member 10.

It is to be noted that, as depicted in FIG. 3, a conductive metal plate 86 electrically connected to the grounding conductor of the printed wiring board 40 is provided at an abutting portion between the writing pressure detection circuit 9 and the shield member 8, and a terminal portion 83 at which the face of the tubular member 81 of the shield member 8 is exposed is electrically connected to the conductive metal plate 86. Consequently, the center electrode 7 is shielded against an electric field by the shield member 8.

It is to be noted that, since the core member fitting portion 11 of the pressure transmission member 10 is engaged with a stepped portion 84 of the hollow portion of the tubular member 81 of the shield member 8, the center electrode 7 and the pressure transmission member 10 are prevented from falling out to the pen tip side. Further, a stepped portion 85 on the outer circumferential face of the shield member 8 is engaged with a stepped portion formed on the inner wall of the hollow portion of the insulator portion 31 of the housing 3 not depicted such that the shield member 8 does not move in an axial direction in the hollow portion of the insulator portion 31 of the housing 3.

The writing pressure detection circuit 9 is described below. The writing pressure detection circuit 9 of the present example uses writing pressure detection means of a known configuration disclosed, for example, in Patent Document: Japanese Patent Laid-Open No. 2011-186803 and configures a variable capacitor whose capacitance varies in response to a writing pressure applied to the center electrode 7.

The writing pressure detection circuit 9 of the present example is configured such that, as depicted in FIG. 3, a plurality of parts including a dielectric member 92, a conductive member 93, an elastic member 94, a holding member 95 and a terminal member 96 are accommodated in a housing member 91 configured from an insulating material, for example, a resin. The terminal member 96 configures a first electrode of a variable capacitor which configures the writing pressure detection circuit 9. Further, the conductive member 93 and the elastic member 94 are electrically connected to each other to form a second electrode of the variable capacitor.

In the writing pressure detection circuit 9, if a writing pressure is applied to the center electrode 7, then the writing pressure is transmitted to the holding member 95 of the writing pressure detection circuit 9 through the pressure transmission member 10, and the holding member 95 moves the conductive member 93 toward the dielectric member 92 side in response to the applied writing pressure. Consequently, the contact area between the conductive member 93 and the dielectric member 92 varies in response to the applied writing pressure, and the capacitance of the variable capacitor formed between the first electrode and the second electrode varies in response to the applied writing pressure.

[Description of Example of Configuration of Internal Electronic Circuit of Position Indicator 1 of Embodiment]

In the present embodiment, as the position detection system 2 used together with the position indicator 1, systems of a plurality of configuration types of the passive scheme, improved type of the passive scheme and active scheme are available as described hereinabove. In the present embodiment, where the position detection system 2 includes a wireless communication circuit that communicates with the wireless communication circuit 42 of the position indicator 1, pen type information indicative of a configuration type which allows action of the position detection system is transmitted to the position indicator 1 by the wireless communication circuit. The position indicator 1 receives pen type information from the position detection system by the reception circuit (first receiver) of the wireless communication circuit 42, determines, on the basis of the received pen type information, to which configuration type (mode) the position indicator is to be set itself, and controls the position indicator 1 itself so as to have a configuration as a position indicator of the determined configuration type.

In the case of a position indicator whose configuration type is the passive scheme or the improved type of the passive scheme in which a transmission signal from the position detection system 2 side is received, the position indicator 1 receives a signal from the position detection system through the peripheral electrode 6 (second receiver) to determine to which configuration type it is to be set itself and can control the position indicator 1 itself so as to have a configuration of a position indicator of the determined type.

In this case, since the passive scheme and the improved type of the passive scheme have a difference in frequency of a signal from a position detection system or a difference in signal contents (difference in spread code, difference in modulation method and so forth), the position indicator 1 decides the differences and determines to which configuration type the position indicator 1 is to be set itself based on a result of the decision. In this case, even when information of a configuration type is not obtained from the position detection system through the wireless communication circuit, it can be decided to which configuration type (mode) the position indicator is to be set itself.

The signal transmission control circuit 41 of the position indicator 1 performs a determination process of a configuration type (mode) of the position indicator 1 based on the information received from the position detection system 2 through the wireless communication circuit 42 or on a signal received through the peripheral electrode 6 described hereinabove and performs also a process for controlling the position indicator 1 so as to have the determined configuration type (mode).

Figure 4:
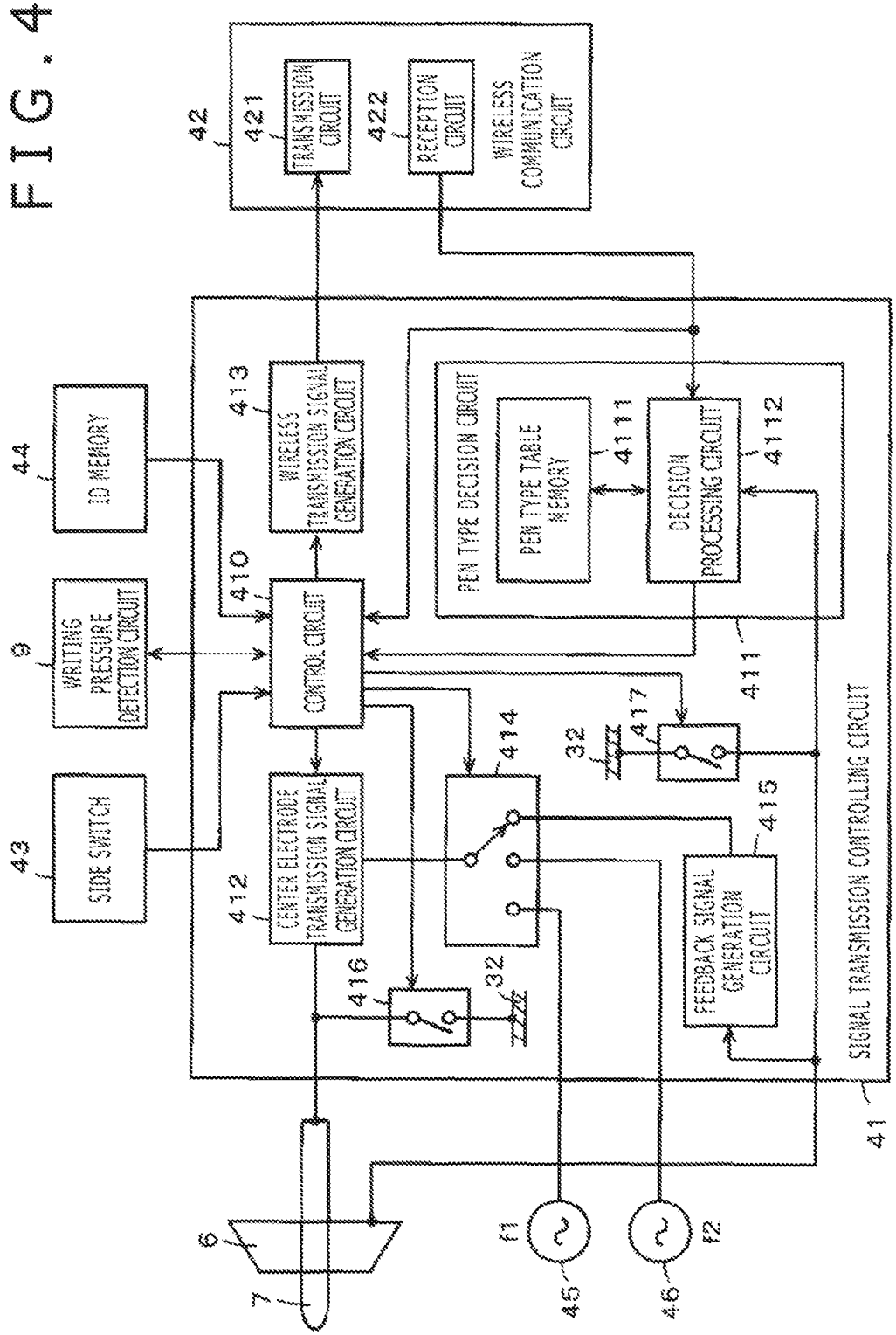
FIG. 4 is a block diagram depicting a conceptual configuration of a position indicator according to an embodiment of the present disclosure and processing action of the same.

FIG. 4 is a block diagram depicting a configuration of an electronic circuit formed on the printed wiring board 40 in the housing 3 of the position indicator 1 of the present embodiment and is a view depicting an example of a detailed internal configuration principally of the signal transmission control circuit 41.

As depicted in FIG. 4, the signal transmission control circuit 41 is configured including a control circuit (i.e., controller) 410 configured, for example, from an IC (Integrated Circuit), a pen type decision circuit 411, a center electrode transmission signal generation circuit 412, a wireless transmission signal generation circuit 413, a switch circuit 414 for selection of a position detecting signal, a feedback signal generation circuit 415, and switch circuits 416 and 417 for switching between a position indicator of the passive scheme and a position indicator of the improved type of the passive scheme and the active scheme.

To the control circuit 410, the variable capacitor configured from the writing pressure detection circuit 9 is connected, and the control circuit 410 calculates a pressure (writing pressure value) applied to the center electrode 7 from a capacitance of the variable capacitor configured from the writing pressure detection circuit 9. Further, an on or off state signal of the side switch 43 is supplied to the control circuit 410. The control circuit 410 generates, from the on or off state signal of the side switch 43, side switch information which is additional information relating to the side switch 43. Further, the ID memory 44 is connected to the control circuit 410, and the control circuit 410 reads out and acquires the identification information (ID) of the position indicator 1 from the ID memory 44 as occasion demands. It is to be noted that the ID memory 44 may be accommodated in the position indicator 1 with the identification information stored therein in advance or may be configured such that the identification information which is the storage contents of the storage ID memory 44 can be rewritten by a command from the position detection system 2 which is received, for example, through the wireless communication circuit 42.

The control circuit 410 controls, in response to information based on a pen type decision result from the pen type decision circuit 411, whether or not each of a plurality of types of additional information, in the present example, each of writing pressure information, side switch information and identification information, is to be transmitted from the center electrode 7 or is to be transmitted by wireless transmission from the wireless communication circuit 42.

The control circuit 410 supplies additional information to be transmitted through the center electrode 7 to the center electrode transmission signal generation circuit 412 and supplies additional information to be transmitted through the wireless communication circuit 42 to the wireless transmission signal generation circuit 413.

The center electrode transmission signal generation circuit 412 is connected to the center electrode 7 such that additional information to be transmitted is transmitted to the position detection system 2 through the center electrode 7 together with a position detecting signal as hereinafter described. The wireless transmission signal generation circuit 413 is connected to a transmission circuit (i.e. transmitter) 421 of the wireless communication circuit 42 such that additional information to be transmitted is transmitted by wireless transmission to the position detection system 2 through the transmission circuit 421.

To the center electrode transmission signal generation circuit 412, an AC signal of the frequency f1 from the oscillator 45 and an AC signal of the frequency f2 from the oscillator 46 are supplied as signals for generating a position detecting signal to be transmitted in response to switching selection of the switch circuit 414 by the control circuit 410, and a feedback signal from the feedback signal generation circuit 415 is supplied as a position detecting signal to be transmitted. The feedback signal generation circuit 415 enhances a signal received from the position detection system 2 through the peripheral electrode 6, in the present example, by amplification and further inverts the phase of the signal. An example of a configuration and an example of processing of the feedback signal generation circuit 415 are hereinafter described in detail. The control circuit 410 generates a switching selection signal for the switch circuit 414 on the basis of information based on a pen type decision result from the pen type decision circuit 411.

Further, the connection portion between the center electrode transmission signal generation circuit 412 and the center electrode 7 is connected to the conductor portion 32 of the housing 3 through the switch circuit 416. Further, the peripheral electrode 6 is connected to the conductor portion 32 of the housing 3 through the switch circuit 417. Further, the switch circuits 416 and 417 are each switched by an on-off control signal from the control circuit 410. The control circuit 410 generates an on-off control signal for each of the switch circuits 416 and 417 on the basis of information based on a pen type decision result from the pen type decision circuit 411.

The pen type decision circuit 411 is configured from a pen type table memory 4111 and a decision processing circuit 4112. To the decision processing circuit 4112 of the pen type decision circuit 411, information from the position detection system 2 received by a reception circuit (i.e., receiver) 422 of the wireless communication circuit 42 is supplied, and a signal received from the position detection system 2 through the peripheral electrode 6 is supplied.

In the pen type table memory 4111, a plurality of configuration types of the position indicator 1 and pen type table information regarding, for the position indicator of each configuration type, whether or not a position detecting signal is to be transmitted and whether a frequency of an oscillator for generating the position detecting signal to be transmitted or additional information is to be transmitted from the center electrode 7 or is to be transmitted through the wireless communication circuit 42 are stored. While the pen type table information may be stored in the pen type table memory 4111 in advance, in the present example, writing and rewriting can be performed through the wireless communication circuit 42 in accordance with a command from the position detection system 2.

The decision processing circuit 4112 decides information from the position detection system 2 received by the reception circuit 422 of the wireless communication circuit 42 or a signal received from the sensor circuit of the position detection system 2 through the peripheral electrode 6 and refers to the pen type table information of the pen type table memory 4111 to decide a configuration type of a position indicator compatible with the position detection system 2 to be used together with the position indicator 1. Then, the decision processing circuit 4112 generates, on the basis of a result of the decision, information regarding whether or not a signal is to be transmitted from the center electrode 7, what a position detecting signal and additional information to be transmitted from the center electrode 7 are and what additional information to be transmitted through the wireless communication circuit 42 is, and supplies the generated information to the control circuit 410.

The control circuit 410 generates a switching selection signal for the switch circuit 414 and on-off controlling signals for the switch circuits 416 and 417 on the basis of the information from the pen type decision circuit 411 and supplies the generated signals to each of the switch circuits 414, 416, and 417. Further, the control circuit 410 determines additional information to be supplied to the center electrode transmission signal generation circuit 412 and additional information to be supplied to the wireless transmission signal generation circuit 413 and supplies the determined additional information to each of the center electrode transmission signal generation circuit 412 and the wireless transmission signal generation circuit 413.

FIG. 5 illustrates an example of the pen type table information of the pen type decision circuit 411. The example of FIG. 5 is table information regarding five different position indicators of the configuration type 1 to configuration type 5 (mode 1 to mode 5). The pen type decision circuit 411 refers, after it decides a configuration type (mode) of a position indicator, to the pen type table information to generate control information to be supplied to the control circuit 410. In the following, it is described that, in the position indicator 1 of the present embodiment, each configuration type (mode) is switchably configured under the control of the control circuit 410.

The configuration type 1 (mode 1) is a position indicator of the passive scheme, and does not transmit a signal from the center electrode 7 while all additional information is transmitted through the wireless communication circuit 42. In particular, in the signal transmission control circuit 41 of the position indicator 1, if the pen type decision circuit 411 decides the configuration of the position indicator 1 is to be of type 1 (mode 1), then the control circuit 410 switches on the switch circuits 416 and 417 and places the center electrode transmission signal generation circuit 412 into an inoperative state. The switch circuit 417 may otherwise be off. Then, the control circuit 410 controls such that all additional information is transmitted to the position detection system 2 through the wireless transmission signal generation circuit 413 and through the transmission circuit 421 of the wireless communication circuit 42. It is to be noted that the identification information may not have to be transmitted as additional information.

The configuration type 2 (mode 2) is a position indicator of the improved type of the passive scheme. If the pen type decision circuit 411 decides the configuration of the position indicator 1 is to be of type 2 (mode 2), then on the basis of the information from the pen type decision circuit 411, the control circuit 410 switches off the switch circuits 416 and 417 and further switches the switch circuit 414 into a state in which a signal from the feedback signal generation circuit 415 is selected. Then, control is performed by the control circuit 410 to transmit all additional information from the position detection system 2 through the wireless transmission signal generation circuit 413 and through the transmission circuit 421 of the wireless communication circuit 42. It is to be noted that the identification information may not be transmitted as the additional information.

The configuration type 3 (mode 3) is a first type of a position indicator of the active scheme. If the pen type decision circuit 411 decides the configuration of the position indicator 1 is to be of type 3 (mode 3), then on the basis of the information from the pen type decision circuit 411, the control circuit 410 switches off the switch circuit 416 and switches on the switch circuit 417 and further switches the switch circuit 414, in the present example, into a state in which an AC signal from the oscillator 45 of the frequency f1 is selected. Then, control is performed by the control circuit 410 to transmit all additional information to the position detection system 2 through the wireless transmission signal generation circuit 413 and through the transmission circuit 421 of the wireless communication circuit 42. It is to be noted that the identification information may not be transmitted as the additional information.

The configuration type 4 (mode 4) is a second type of a position indicator of the active scheme. If the pen type decision circuit 411 decides the configuration of the position indicator 1 is to be of type 4 (mode 4), then on the basis of the information from the pen type decision circuit 411, the control circuit 410 switches off the switch circuit 416 and switches on the 417 and further switches the switch circuit 414, in the present example, into a state in which an AC signal from the oscillator 46 of the frequency f2 is selected. Then, control is performed by the control circuit 410 to transmit the writing pressure information and the side switch information from within the additional information out together with a position detecting signal from the center electrode 7, and control is performed by the control circuit 410 to transmit the identification information ID to the position detection system 2 through the wireless transmission signal generation circuit 413 and through the transmission circuit 421 of the wireless communication circuit 42.

The configuration type 5 (mode 5) is a third type of a position indicator of the active scheme. If the pen type decision circuit 411 decides the configuration of the position indicator 1 is to be of type 5 (mode 5), then on the basis of the information from the pen type decision circuit 411, the control circuit 410 switches off the switch circuit 416 and switches on the switch circuit 417 and further switches the switch circuit 414, in the present example, into a state in which an AC signal from the oscillator 46 of the frequency f2 is to be selected. Then, control is performed by the control circuit 410 to transmit all of the additional information from the center electrode 7 together with the position detecting signal.

In this manner, the signal transmission control circuit 41 decides a configuration type of a position indicator on the basis of information and signals received from the sensor circuit of the position detection system 2 through the reception circuit 422 of the wireless communication circuit 42 and the peripheral electrode 6 and configures the position indicator 1 as a position indicator of the decided configuration type. Accordingly, the position indicator 1 of the present embodiment can automatically configure and use position indicators of the various configuration types compatible with a plurality of position detection systems 2 of various schemes. In other words, position indication input can be performed only by the position indicator 1 of the present embodiment for a plurality of position detection systems 2 of various schemes. Therefore, there is no necessity to prepare a position indicator for each of a plurality of position detection systems 2 of various schemes, which is very convenient, and also the burden on the user in terms of cost is reduced.

It is to be noted that the pen type information from the position detection systems 2 received through the wireless communication circuit 42 is not limited to information of a configuration type by which each of the configuration types 1 to 5 is identified directly, but may be information which indirectly indicates the numbers of the configuration types 1 to 5 of the pen type table information, addresses of the configuration types of the pen type table memory 4111 and so forth.

It is to be noted that, in FIG. 4, it is also possible for the control circuit 410 to configure the processing functions of the decision processing circuit 4112 of the pen type decision circuit 411, the center electrode transmission signal generation circuit 412 and the wireless transmission signal generation circuit 413 as software. This similarly applies also to the feedback signal generation circuit 415.

[Example of Processing Operations of Signal Transmission Control Circuit 41]

Figure 6:
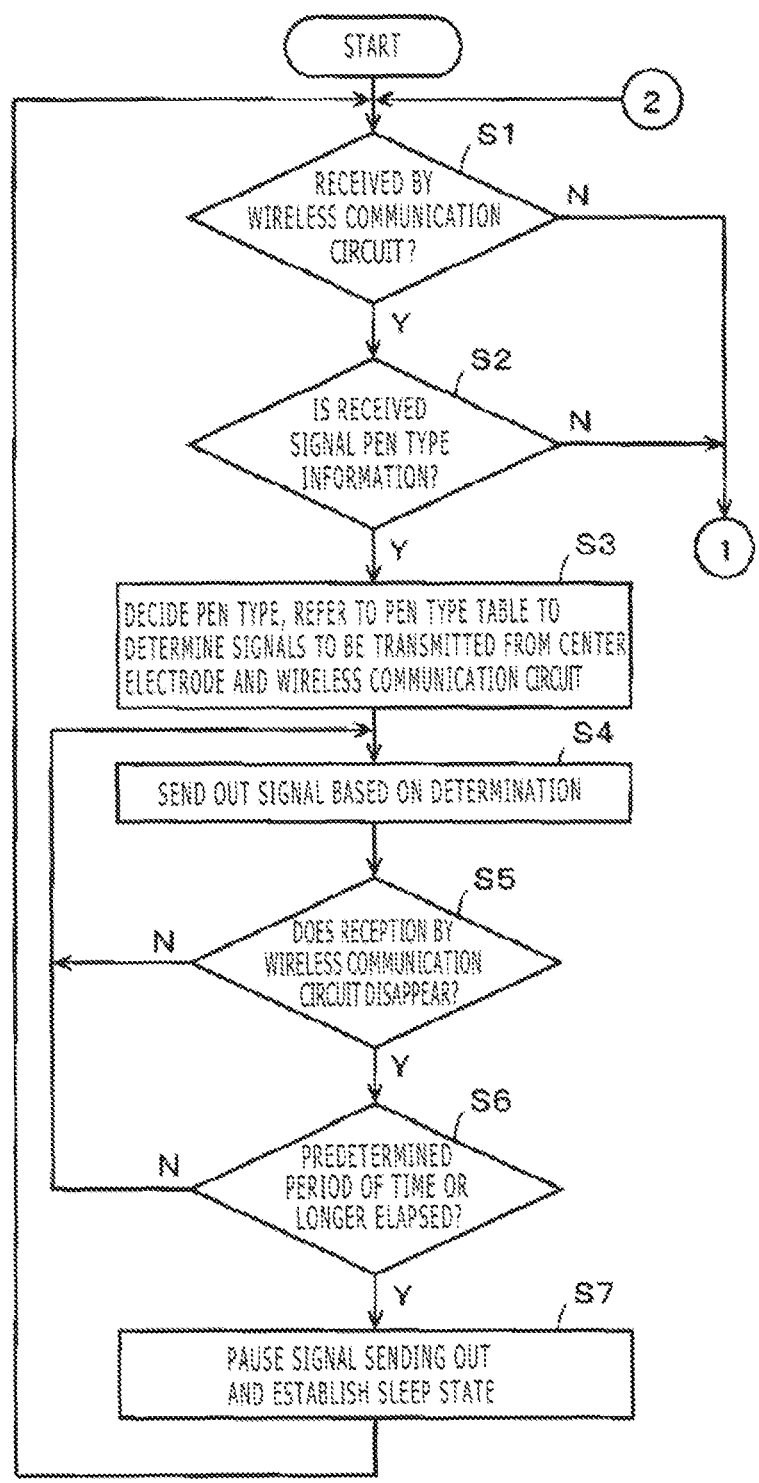
FIG. 6 is a view depicting part of a flow chart illustrating an example of a flow of processing operations of a position indicator according to an embodiment of the present disclosure.

Now, an example of processing operations performed by the signal transmission control circuit 41 after the power supply switch 48 is switched on is described with reference to flow charts of FIGS. 6 and 7.

The signal transmission control circuit 41 first decides whether or not information is received by the reception circuit 422 of the wireless communication circuit 42 (S1), and if it is decided that information is received, then the signal transmission control circuit 41 decides whether or not the received information is pen type information (S2). If it is decided at S2 that the received information is pen type information, then the signal transmission control circuit 41 decides a configuration type (pen type) of the position indicator on the basis of the received pen type information and refers to the pen type table memory 4111 to determine signals to be transmitted from the center electrode 7 and the transmission receiver 421 of the wireless communication circuit 42 (S3). This determination includes a determination of whether or not a position detecting signal is to be transmitted from the center electrode 7 as described hereinabove.

Next, the signal transmission control circuit 41 performs control to transmit a signal out in accordance with the configuration type decided at S3 through the center electrode 7 and the transmission circuit 421 of the wireless communication circuit 42 (step S4).

Then, the signal transmission control circuit 41 decides whether or not it has become impossible to receive information from the position detection system 2 through the reception circuit 422 of the wireless communication circuit 42 (S5), and if it is decided that it has not become impossible to receive information, then the signal transmission control circuit 41 returns the processing at S4 to continue the signal transmission in accordance with the decided configuration type.

If it is decided at S5 that it has become impossible to receive information from the position detection system 2 through the reception circuit 422 of the wireless communication circuit 42, then the signal transmission control circuit 41 decides whether or not a predetermined period of time or longer elapses after it has become impossible to receive information (S6). If it is decided at S6 that the predetermined period of time or longer does not elapse, then the signal transmission control circuit 41 returns to S4 and sends the signal in accordance with the decided configuration type.

If it is decided at S6 that the predetermined period of time or longer has elapsed, then the signal transmission control circuit 41 pauses the signal transmission from the center electrode 7 and the transmission circuit 421 of the wireless communication circuit 42 and places the position indicator 1 into a sleep state (S7). In this sleep state, in order to reduce exhaustion of the battery 5 as far as possible to achieve power savings, although supply of power to the reception circuit 422 of the wireless communication circuit 42 and the control circuit 410 and pen type decision circuit 411 of the signal transmission control circuit 41 is maintained, wasteful power supply to the other components is stopped.

Then, the signal transmission control circuit 41 returns to S1 and repeats the processing operations described above.

Figure 7:
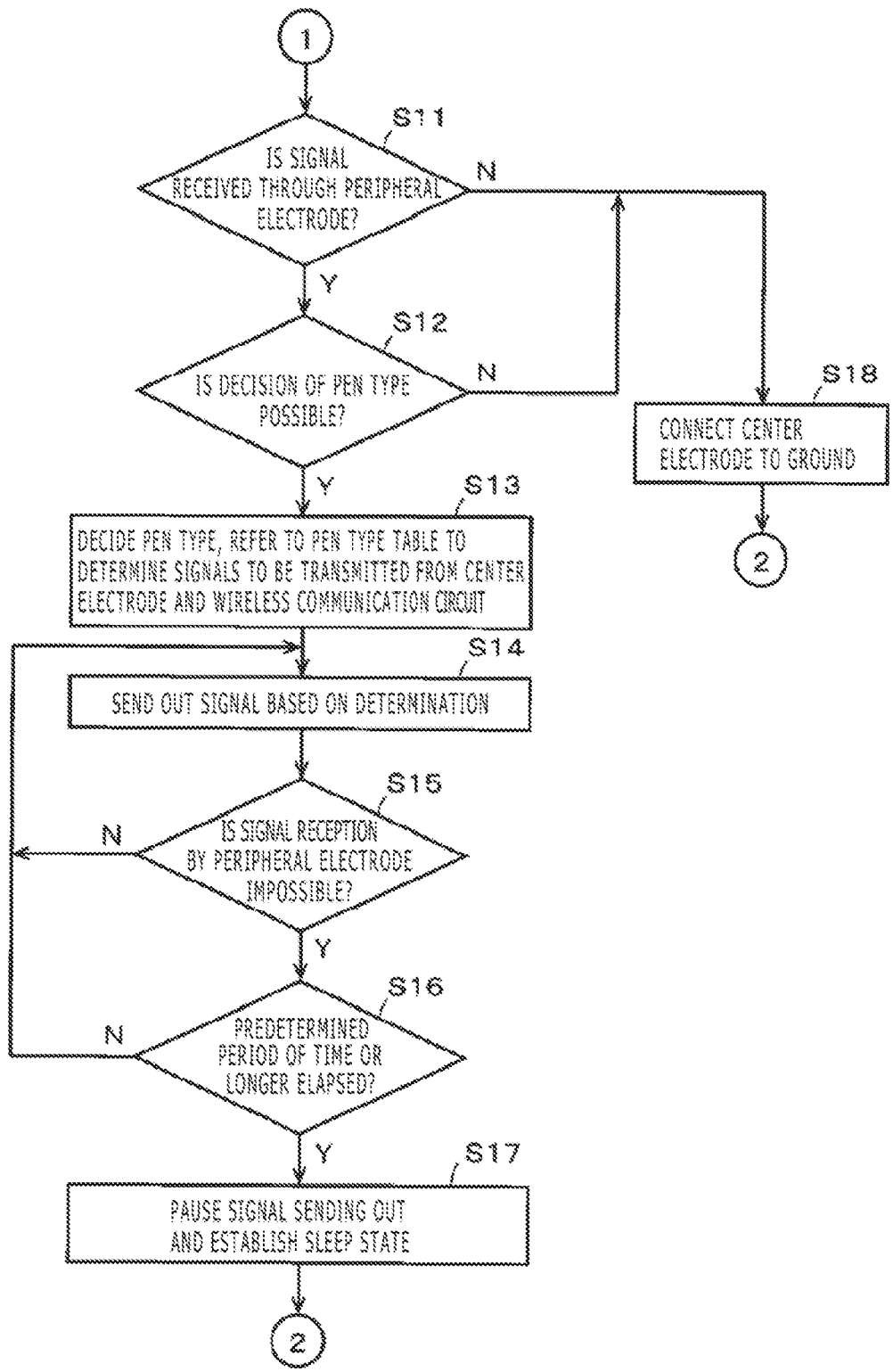
FIG. 7 is a view depicting part of a flow chart illustrating an example of a flow of processing operations of a position indicator according to an embodiment of the present disclosure.

When it is decided at S1 that information is not received by the reception circuit 422 of the wireless communication circuit 42, or when it is decided at S2 that the received information is not pen type information, the signal transmission control circuit 41 decides whether or not a signal is received through the peripheral electrode 6 (S11 of FIG. 7). If it is decided at S11 that a signal is not received through the peripheral electrode 6, then the signal transmission control circuit 41 switches on the switch circuit 416 to connect the center electrode 7 to the grounding conductor (ground) of the printed wiring board 40 through the conductor portion 32 to establish a state of the configuration type 1 (S18). Then, the signal transmission control circuit 41 returns the processing to S1 of FIG. 6 and repeats the processing operations described above beginning at S1.

If it is decided at S11 that a signal is received through the peripheral electrode 6, then it is decided whether or not it is possible to decide a pen type from the received signal (S12). If it is decided at step that it is not possible to decide a pen type, then the signal transmission control circuit 41 switches on the switch circuit 416 to connect the center electrode 7 to the grounding conductor (ground) of the printed wiring board 40 through the conductor portion 32 to establish a state of the configuration type 1 (S18). Then, the signal transmission control circuit 41 returns to S1 of FIG. 6 and repeats the processing operations beginning with S1.

If it is decided at S12 that it is possible to decide a pen type, then the signal transmission control circuit 41 decides a configuration type (pen type) of the position indicator on the basis of the received signal and refers to the pen type table memory 4111 to determine signals to be transmitted from the center electrode 7 and the transmission circuit transmitter 421 of the wireless communication circuit 42 (S13). This determination includes a determination of whether or not a position detecting signal is to be transmitted from the center electrode 7 as described hereinabove.

Next, the signal transmission control circuit 41 performs control to transmit the signal out in accordance with the configuration type decided at S13 through the center electrode 7 and the transmission circuit 421 of the wireless communication circuit 42 (S14).

Then, the signal transmission control circuit 41 decides whether or not it has become impossible to receive a signal through the peripheral electrode 6 (S15), and if it is decided that it has not become impossible to receive a signal through the peripheral electrode 6, then the signal transmission control circuit 41 returns the processing to S14 and continues the signal transmission in accordance with the decided configuration type.

If it is decided at S15 that it has become impossible to receive a signal through the peripheral electrode 6, then the signal transmission control circuit 41 decides whether or not a predetermined period of time or longer elapses (S16). If it is decided at S16 that the predetermined period of time or longer does not elapse, then the signal transmission control circuit 41 returns the processing to S14 and continues the signal transmission in accordance with the decided configuration type.

If it is decided at S16 that the predetermined period of time or longer elapses, then the signal transmission control circuit 41 pauses the signal transmission from the center electrode 7 and the transmission circuit 421 of the wireless communication circuit 42 and places the position indicator 1 into a sleep state (S17). Then, the signal transmission control circuit 41 returns the processing to S1 and repeats the processing operations beginning with S1, as described hereinabove.

[Description of Operation of Position Indicators of Various Configuration Types and Compatible Position Detection Systems]

<Position Indicator 1A of Configuration Type 2 and Compatible Position Detection System 2A>

Figure 8:
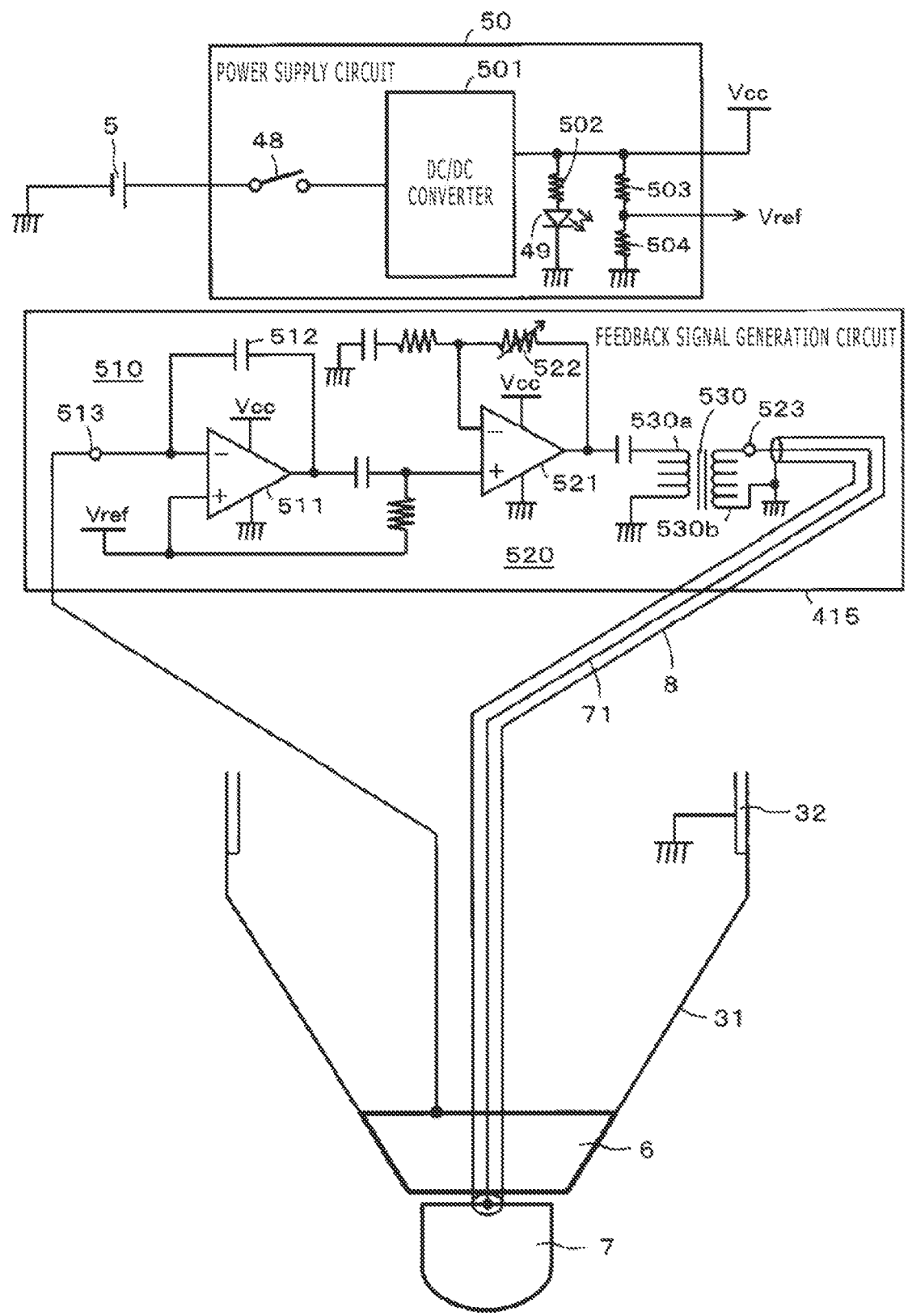
FIG. 8 is a view depicting an example of a position indicator of a configuration type which can be configured according to an embodiment of the present disclosure.

FIG. 8 is a view depicting an example of a circuit of a principal portion of the position indicator 1A of the configuration type 2 and particularly depicting an example of a circuit configuration of a feedback signal generation circuit 415 and an example of a circuit configuration of a power supply circuit 50 whose description is omitted above.

The power supply circuit 50 includes a DC/DC (Direct Current-Direct Current) converter 501 and generates a power supply voltage +Vcc from a voltage of the battery 5 and supplies the power supply voltage +Vcc to the signal transmission control circuit 41 and other components.

Further, in the power supply circuit 50, a power supply switch 48 is provided between the DC/DC converter 501 and the battery 5. Further, a series circuit of a resistor 502 and an LED 49 is connected between an output terminal of the DC/DC converter 501 and a grounding conductor. Furthermore, an output terminal of the DC/DC converter 501 is connected to a grounding conductor through a series connection of a resistor 503 and another resistor 504, and a reference voltage Vref (=Vcc/2, for example) is outputted from the connection point between the resistor 503 and the resistor 504.

The feedback signal generation circuit 415 is configured, in the present example, as a signal enhancement processing circuit and is configured from a sense amplifier 510, a signal amplification factor variation circuit 520 and a transformer 530.

In the present example, the sense amplifier 510 is configured from an operational amplifier 511, and a capacitor 512 connected between an inverting input terminal and an output terminal of the operational amplifier 511. The inverting input terminal of the operational amplifier 511 is connected to a connection terminal 513 connected to the peripheral electrode 6. Further, the reference voltage Vref described hereinabove is supplied to a non-inverting input terminal of the operational amplifier 511.

When the position indicator 1A is on the position detection system 2A, the peripheral electrode 6 of the position indicator 1A and the position detection system 2A are coupled to each other through a capacitance C1 as depicted in FIG. 1. Since an AC signal flows in the position detection system 2A as hereinafter described, this AC signal is supplied as a current signal to the connection terminal 513 through the capacitance C1 and the peripheral electrode 6 and inputted to the sense amplifier 510. The capacitor 512 is provided to detect the current signal inputted thereto through the capacitance C1.

Then, the sense amplifier 510 inverts the phase of the AC signal inputted as a current signal through the connection terminal 513 and outputs the inverted phase AC signal to the signal amplification factor variation circuit 520.

The signal amplification factor variation circuit 520 is configured from an operational amplifier 521, and a variable resistor 522 connected between an inverting input terminal and an output terminal of the operational amplifier 521. By variably setting the resistance value of the variable resistor 522, the amplification factor of the signal amplification factor variation circuit 520 is variably set, and as a result, the signal detection sensitivity of the position indicator 1A is controlled.

The AC signal amplified by the signal amplification factor variation circuit 520 is supplied to a primary winding 530a of the transformer 530. The ratio between the number of winding n1 of the primary winding 530a and the number of winding n2 of a secondary winding 530b of the transformer 530 is set such that the number of windings on the secondary winding 530b side is greater like, for example, n1:n2=1:10 (n1<n2). Accordingly, on the secondary winding 530b side of the transformer 530, the output signal of the signal amplification factor variation circuit 520 has an amplitude multiplied in accordance with the winding number ratio, and an AC signal (voltage signal) of the increased amplitude is obtained.

The secondary winding 530b of the transformer 530 is connected at one end thereof to a connection terminal 523 connected to the core member 71 configured from a bar-like conductor of the center electrode 7 shielded by the shield member 8, and is connected at the other end thereof to a grounding conductor of the printed wiring board 40. Accordingly, an output signal formed as an AC signal voltage of a great amplitude by the feedback signal generation circuit 415 is supplied to the center electrode 7 through the connection terminal 523.

When the position indicator 1A is on the position detection system 2A, since the center electrode 7 of the position indicator 1A and the position detection system 2A are coupled to each other by a capacitance, an AC signal is fed back from the position indicator 1A to the position detection system 2A through the center electrode 7 of the position indicator 1A.

Now, the position detection system 2A of the present example is described with reference to FIG. 9. The position detection system 2A of the present example is configured as a position detection system of the mutual capacitance scheme wherein sensor electrodes are configured from an input electrode and an output electrode and a variation of the coupling capacitance with a touch point at which the position indicator 1A touches is detected.

Figure 9:
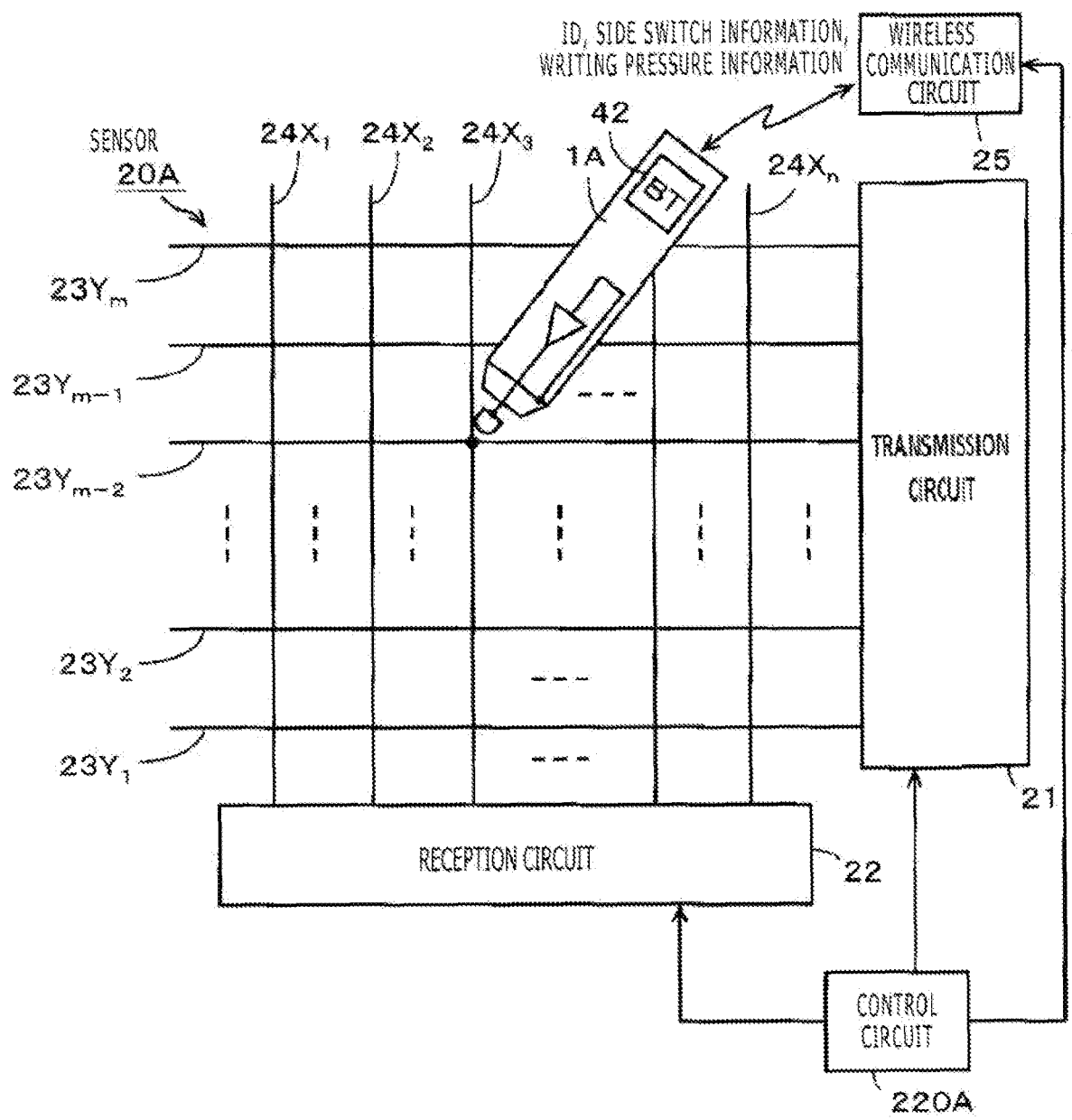
FIG. 9 is a view depicting an example of a position indicator of a configuration type which can be configured according to an embodiment of the present disclosure and a compatible position detection system.

As depicted in FIG. 9, the position detection system 2A of the present example includes a sensor 20A, a transmission circuit 21, a reception circuit 22, a wireless communication circuit 25, and a control circuit 220A. The sensor 20A includes a plurality of, in the present example, m, linear transmission conductors $23Y_1, 23Y_2, \ldots, 23Y_m$ (m is an integer equal to or greater than 1) extending in a transverse direction (X-axis direction) of the sensor inputting face, and a plurality of, in the present example, n, reception conductors $24X_1, 24X_2, \ldots, 24X_n$ (n is an integer equal to or greater than 1) extending in a longitudinal direction (Y-axis direction) of the sensor inputting face orthogonal to the transmission conductors $23Y_1$ to $23Y_m$. The plurality of transmission conductors $23Y_1$ to $23Y_m$ are disposed at equal distances in the Y-axis direction and connected to the transmission circuit 21. Meanwhile, the plurality of reception conductors $24X_1$ to $24X_n$ are disposed at equal distances in the X-axis direction and connected to the reception circuit 22.

It is to be noted that, in the explanation of the present description given below, where there is no necessity to distinguish the transmission conductors $23Y_1$ to $23Y_m$ from each other and to distinguish the reception conductors $24X_1$ to $24X_n$ from each other, each of them is referred to as transmission conductor 23Y and reception conductor 24X.

The plurality of transmission conductors 23Y and the plurality of reception conductors 24X are disposed in a spaced relationship by a predetermined distance from each other and have a mutually orthogonal disposition relationship so as to form a plurality of intersecting points (cross points). At each cross point, it can be regarded that a transmission conductor 23Y and a reception conductor 24X are coupled to each other through a predetermined capacitance.

The transmission circuit 21 supplies a predetermined AC signal to a transmission conductor 23Y under the control of the control circuit 220A. In this case, the transmission circuit 21 may supply a same AC signal to the plurality of transmission conductors $23Y_1, 23Y_2, \ldots, 23Y_m$ by successively changing over them one by one or may supply a plurality of AC signals different from each other to the plurality of transmission conductors $23Y_1, 23Y_2, \ldots, 23Ym$ at the same time. Alternatively, the plurality of transmission conductors $23Y_1, 23Y_2, \ldots, 23Y_m$ may be divided into a plurality of groups such that AC signals different among the different groups may be used.

The reception circuit 22 detects a signal component when an AC signal supplied to a transmission conductor 23Y is transmitted through the predetermined capacitance to each of the reception conductors $24X_1, 24X_2, \ldots, 24X_n$ under the control of the control circuit 220. If it is assumed that the coupling capacitance between a transmission conductor 23Y and a reception conductor 24X is equal at all cross points, then when the position indicator 1A is not on the sensor 20A, a reception signal of a predetermined level is detected by the reception circuit 22 from all of the reception conductors $24X_1, 24X_2, \ldots, 24X_n$ of the sensor circuit 20A.

In contrast, if the position indicator 1A contacts the sensor 20A, then a transmission conductor 23Y and a reception conductor 24X which configure the cross point at the contact position and the position indicator 1A are coupled to each other through the capacitance. In other words, the capacitance is varied by the position indicator 1A, and the reception signal level obtained from the reception conductor 24X at the cross point at which the position indicator 1A exists exhibits a variation in comparison with the reception signal level at the other cross points.

The reception circuit 22 detects, from among the plurality of the reception conductors $24X_1, 24X_2, \ldots, 24X_n$, a reception conductor 24X which exhibits a variation of the level of the reception signal to detect the indication position by the position indicator 1A. Then, the control circuit of the position detection system 2A which is not depicted in FIG. 9 detects the transmission conductor 23Y to which the AC signal is supplied from the transmission circuit 21 and the reception conductor 24X whose variation in reception signal level is detected by the reception circuit 22 to detect the cross point with which the position indicator 1A contacts.

Also when not the position indicator 1A but a finger comes close to or contacts the sensor 20A, the position detection system 2A detects a cross point close to or contacted by the finger in accordance with a similar principle. In this case, part of the AC signal supplied to the transmission conductor 23Y flows to the ground through the finger and further through the human body of the user. Therefore, the reception signal level of the reception conductor 24X which configures the cross point at which the finger exists varies. The reception circuit 22 detects the variation of the reception signal level to detect the reception conductor 24X which configures the cross point at which the finger exists.

Where the position indicator is of the configuration type 1, the position detection system 2A can perform detection of an indication position on the sensor 20A similarly in accordance with the principle of position detection of a finger. However, in the case of the position indicator of the configuration type 1, since the contact area of the position indicator with the position detection system 2A is not as great as that of a finger with the position detection system 2A, the coupling capacitance is low and the position detection system 2A indicates a lower detection sensitivity. Therefore, the position detection system compatible with the position indicator of the configuration type 1 compensates for the detection sensitivity against the decrease by taking a correlation of a transmission signal and a reception signal using a spread code as an AC signal to be transmitted to the position indicator or taking a like means to detect the indication position of the position indicator.

In contrast, in the case of the position indicator 1A of the configuration type 2 and the position detection system 2A, even if a spread code or the like is not used, the affinity between the position indicator 1A and the position detection system 2A is high and besides the versatility of them is high. Furthermore, a predetermined waveform correlation is secured between an input signal and an output signal and position detection on the sensor 20A can be achieved with a high sensitivity.

In particular, when the position indicator 1A is moved close to or brought into contact with the sensor 20A of the position detection system 2A, the AC signal supplied to a transmission conductor 23Y is inputted to the feedback signal generation circuit 415 through the capacitance C1 as depicted in FIG. 1 and through the peripheral electrode 6 and as a current signal further through the connection terminal 513.

The AC signal (current signal) inputted to the feedback signal generation circuit 415 is inverted in phase by the sense amplifier 510 and amplified by the signal amplification factor variation circuit 520, and is further boosted (multiplied) into an enhanced signal by the transformer 530 and supplied as a voltage signal to the center electrode 7 through the connection terminal 523. In particular, the AC signal inputted from the sensor 20A to the feedback signal generation circuit 415 through the peripheral electrode 6 is inverted in phase and enhanced into a signal of an increased amplitude in the feedback signal generation circuit 415, and then fed back to the sensor 20A through the center electrode 7.

In this case, since the AC signal fed back from the center electrode 7 of the position indicator 1A to the sensor 20A of the position detection system 2A is a signal of an inverted phase enhanced from the AC signal supplied to the transmission conductor 23Y, the position indicator 1A functions to further increase the variation of the AC signal of the reception signal of the reception conductor 24X. Therefore, the position detection system 2A can detect the contact position of the position indicator 1A with a high sensitivity. It is to be noted that, where the grounding conductor of the position indicator 1A is connected to the human body, the detection action is further stabilized. In particular, in the present embodiment, the housing 3 of the position indicator 1A is covered with the conductor portion 32 connected to a grounding conductor of the printed wiring board 40. Therefore, the AC signal supplied to the transmission conductor 23Y in the position detection system 2A flows to the ground through the position indicator 1A and further through the human body of the user, and consequently, further stabilization of the signal detection action can be anticipated.

Further, where the voltage at the transmission conductor 23Y of the sensor 20A of the position detection system 2A is represented by V, the voltage at the center electrode 7 of the position indicator 1 of the present embodiment is represented by e and the capacitance between the peripheral electrode 6 and the center electrode 7 is represented by C2 (refer to FIG. 1), they have a relationship of $$e \leq C1/C2 \cdot V$$

Therefore, in order to make the voltage e of the center electrode 7 high, it is advantageous to decrease the capacitance C2 between the peripheral electrode 6 and the center electrode 7 as far as possible.

To this end, in the position indicator 1 of the present embodiment, the shield member 8 is interposed between the peripheral electrode 6 and the center electrode 7 to decrease the coupling between them as far as possible. Accordingly, in the position indicator 1 of the present embodiment, the capacitance C2 between the peripheral electrode 6 and the center electrode 7 is decreased by interposing the shield member 8 between them, and the voltage e can be made higher and the sensitivity can be increased efficiently.

The position indicator 1 of the embodiment described above is configured such that the peripheral electrode 6 receives an AC signal from the position detection system 2A and an enhanced output AC signal is fed back from the center electrode 7 to the position detection system 2A. However, the electrode for receiving an AC signal from the position detection system 2A may be the center electrode 7 while the electrode for feeding back an enhanced AC signal to the position detection system 2A may be the peripheral electrode 6.

It is to be noted that, as depicted in FIG. 9, in the position indicator 1A of the configuration type 2, writing pressure information, side switch information and identification information are wirelessly transmitted from the wireless communication circuit 42 to the wireless communication circuit 25 of the position detection system 2A. The writing pressure information, side switch information and identification information received by the wireless communication circuit 25 are supplied to the control circuit 220A and transmitted, for example, to a host computer together with the detected position information. Also, additional information from the position indicator of the configuration type 1 is transmitted from the wireless communication circuit 42 to the position detection system in a similar manner.

<Position Indicator 1B of Configuration Type 3 and Compatible Position Detection System 2B>

Figure 10:
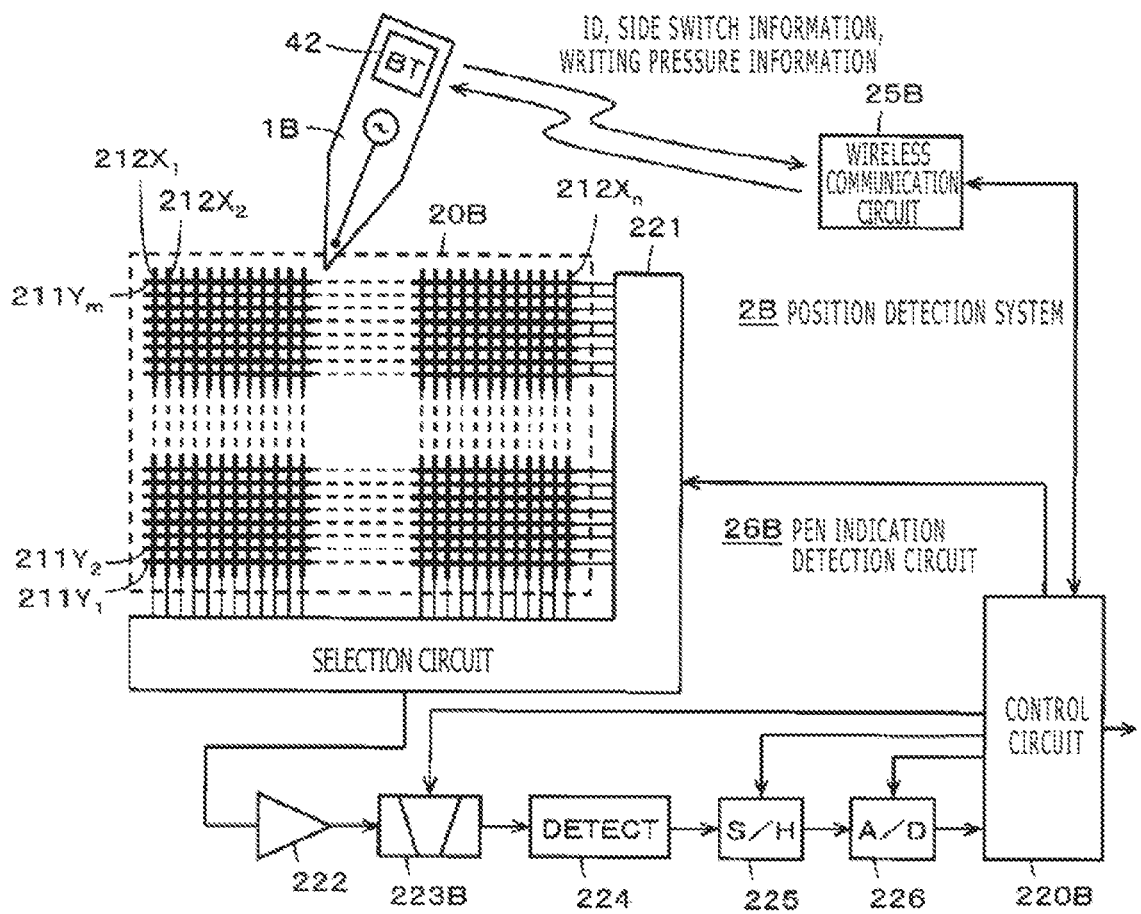
FIG. 10 is a view depicting another example of a position indicator of a configuration type which can be configured according to an embodiment of the present disclosure and a compatible position detection system.

FIG. 10 is a view depicting an example of a circuit of a principal portion of a position indicator 1B of the configuration type 3 and a compatible position detection system 2B. The position indicator 1B of the configuration type 3 transmits transmits an AC signal of a frequency f1 as a position detecting signal and transmits transmits all of writing pressure information, side switch information and identification information, which are additional information, from a wireless communication circuit 42 to a wireless communication circuit 25B of the position detection system 2B.

As depicted in FIG. 10, the position detection system 2B is configured from a sensor 20B, a pen indication detection circuit 26B connected to the sensor 20B, and the wireless communication circuit 25B.

The sensor 20B is configured by stacking a first conductor group 211, an insulating layer (not depicted) and a second conductor group 212 in order from the lower layer side. The first conductor group 211 includes a plurality of first conductors $211Y_1, 211Y_2, \ldots, 211Y_m$ (m is an integer equal to or greater than 1) extending in a transverse direction (X-axis direction) and disposed in parallel to each other in a Y-axis direction in a spaced relationship by a predetermined distance from each other.

Meanwhile, the second conductor group 212 includes a plurality of second conductors $212X_1, 212X_2, \ldots, 212X_n$ (n is an integer equal to or greater than 1) extending in a direction crossing with the extending direction of the first conductors $211Y_1, 211Y_2, \ldots, 211Y_m$, in the present example, in a longitudinal direction (Y-axis direction) orthogonal to the extending direction of the first conductors $211Y_1, 211Y_2, \ldots, 211Y_m$, and disposed in parallel to each other in the X-axis direction in a spaced relationship by a predetermined distance from each other.

It is to be noted that, in the following description, where there is no necessity to distinguish the first conductors $211Y_1, 211Y_2, \ldots, 211Y_m$ from each other, each of the conductors is referred to as first conductor 211Y. Similarly, where there is no necessity to distinguish the second conductors $212X_1, 212X_2, \ldots, 212X_n$ from each other, each of the conductors is referred to as second conductor 212X.

The pen indication detection circuit 26B is configured from a selection circuit 221 serving as an input/output interface with the sensor circuit 20B, an amplification circuit 222, a band pass filter 223B, a detection circuit 224, a sample and hold circuit 225, an AD (Analog to Digital) conversion circuit 226, and a control circuit 220B.

The selection circuit 221 selects one conductor from each of the first conductors 211Y and the second conductors 212X in accordance with a control signal from the control circuit 220B. Each of the conductors selected by the selection circuit 221 is connected to the amplification circuit 222 such that a signal from the position indicator 1B is detected by the selected conductor and amplified by the amplification circuit 222. An output of the amplification circuit 222 is supplied to the band pass filter 223B, by which only a component of the frequency f1 is extracted from the signal transmitted from the position indicator 1B.

The output signal of the band pass filter 223B is detected by the detection circuit 224. An output signal of the detection circuit 224 is supplied to the sample and hold circuit 225, and a sample thereof is held at a predetermined timing in response to a sampling signal from the control circuit 220B by the sample and hold circuit 225 and then converted into a digital value by the AD conversion circuit 226. The digital data from the AD conversion circuit 226 is read and processed by the control circuit 220B.

The control circuit 220B operates to transmit control signals to the sample and hold circuit 225, AD conversion circuit 226 and selection circuit 221 in accordance with a program stored in an internal ROM (Read Only Memory). Further, the control circuit 220B calculates a positional coordinate on the sensor 20B indicated by the position indicator 1B from the digital data from the AD conversion circuit 226.

Figure 11:
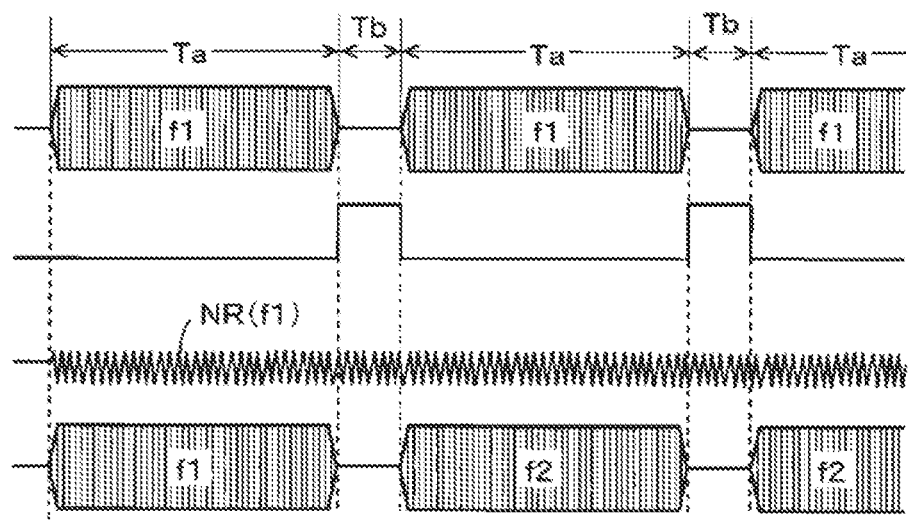
FIG. 11 is a timing chart illustrating the example of FIG. 10.

FIG. 11 is a timing chart illustrating a signal transmitted from the position indicator 1B of the configuration type 3 to the compatible position detection system 2B. As described above, for example, a signal based on an AC signal of the frequency f1 is transmitted successively as a position detecting signal from the position indicator 1B of the configuration type 3 through the center electrode 7.

However, in the position indicator 1B of the configuration type 3 of the present example, making use of an advantage that the position indicator 1 of the embodiment can send out an AC signal of the frequency f1 and another AC signal of the frequency f2 as position detecting signals, the frequency of the position detecting signal can be switched when noise of a frequency equal to that of the position detecting signal exists.

In particular, in the position indicator 1B of the configuration type 3 in the embodiment, as depicted in the upper portion of FIG. 11, the position detecting signal is configured such that one cycle configured from a continuous transmission period having a predetermined period length Ta and a pause period having another predetermined period length Tb is repeated.

In the control circuit 220B of the position detection system 2B, as depicted in FIG. 11 (second from top), using the pause period of the predetermined period length Tb as a window interval for detecting presence or absence of noise, it is detected within the window interval whether or not there exists noise of a frequency equal to that of the position detecting signal. If it is detected within the window interval that there exists noise of a frequency equal to that of the position detecting signal, then the control circuit 220B of the position detection system 2B issues a notification of this to the position indicator 1B through the wireless communication circuit 25B.

If the notification is received from the position detection system 2B, then the reception circuit 422 of the wireless communication circuit 42 of the position indicator 1B transfers the received notification to the control circuit 410 of the signal transmission control circuit 41. The control circuit 410 of the signal transmission control circuit 41 performs switching control of the switch circuit 414 in accordance with the notification to perform switching from a state in which the oscillator 45 of the frequency f1 is selected to another state in which the oscillator 46 of the frequency f2 is selected. It is to be noted that, where the position detecting signal from the position indicator 1B when the notification from the position detection system 2B is received is based on a signal from the oscillator 46 of the frequency f2, in accordance with the notification from the position detection system 2B, the control circuit 410 performs switching control of the switch circuit 414 thereby to perform switching from the state in which the oscillator 46 of the frequency f2 is selected to the state in which the oscillator 45 of the frequency f1 is selected.

For example, when the position detecting signal from the position indicator 1B is a signal of the frequency f1 as depicted in FIG. 11, if noise NR at a frequency equal to the frequency f1 exists as depicted in FIG. 11, then the control circuit 220B of the position detection system 2B detects the noise NR within the window interval depicted in FIG. 11 and sends the result of the detection to the position indicator 1B through the wireless communication circuit 25B.

In the position indicator 1B, the control circuit 410 receives the notification from the position detection system 2B through the reception circuit 422 of the wireless communication circuit 42 and performs switching control of the switch circuit 414 such that the frequency of the position detecting signal is switched from the frequency f1 to the frequency f2 as depicted in the lower portion of FIG. 11. Accordingly, even if noise of a frequency equal to that of the position detecting signal exists around the position detection system 2B, the influence of the noise can be eliminated by the switching of the frequency of the position detecting signal.

It is to be noted that, in the position detection system 2B, the band pass filter 223B has a state in which the pass frequency band has the center frequency at the frequency f1 and another state in which the pass frequency band has the center frequency at the frequency f2 such that the position detection system 2B can deal with both of position detecting signals of the frequency f1 and the frequency f2. Further, the position detection system 2B is configured such that it can switchably determine which one of the pass frequency bands is to be used under the control of the control circuit 220B.

<Position Indicator 1C of Configuration Type 4 and Compatible Position Detection System 2C>

Figure 12:
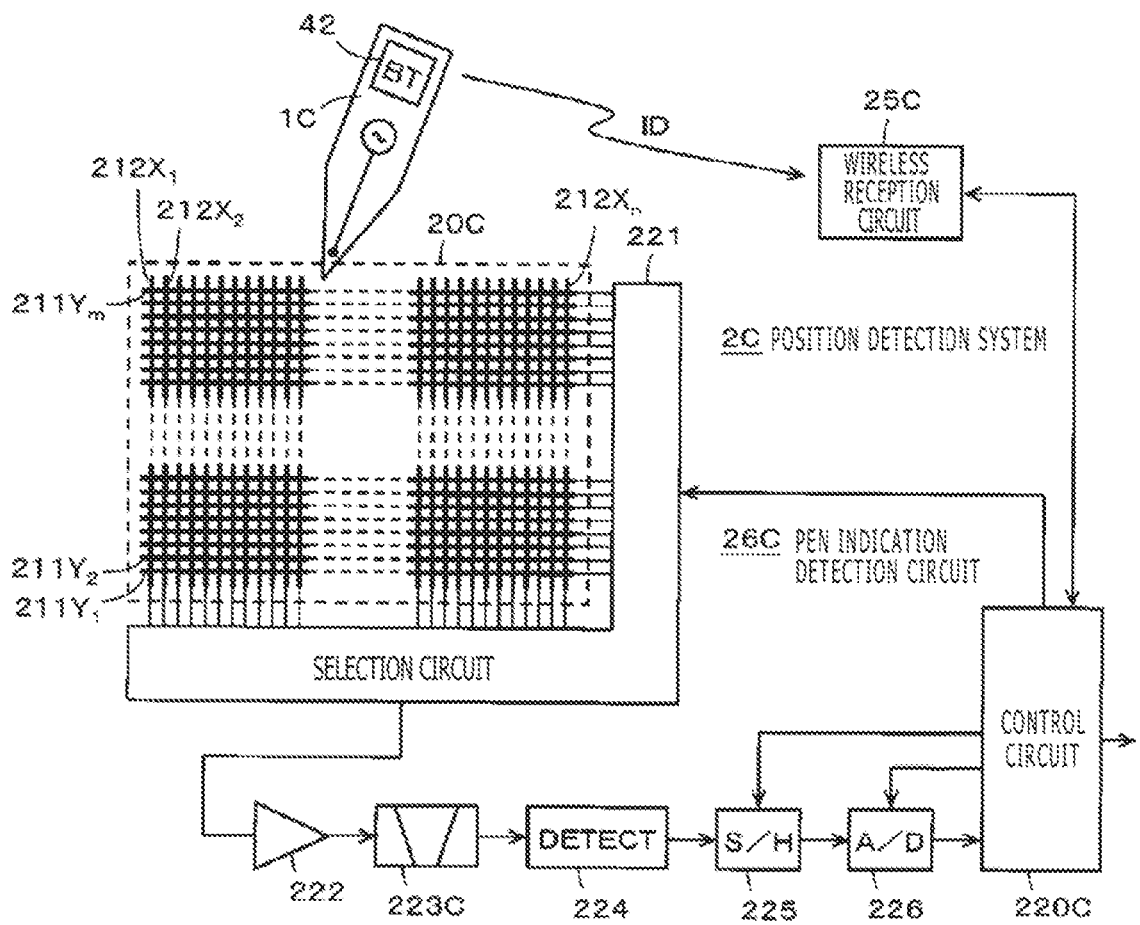
FIG. 12 is a view depicting still another example of a position indicator of a configuration type which can be configured according to an embodiment of the present disclosure and a compatible position detection system.

FIG. 12 is a view depicting an example of a circuit of a principal portion of a position indicator 1C of the configuration type 4 and a compatible position detection system 2C. The position indicator 1C of the configuration type 4 transmits transmits an AC signal of the frequency f2 as a position detecting signal and transmits transmits writing pressure information and side switch information, which are examples of important additional information to the position indicator, to the position detection system 2C through the center electrode 7 together with the position detecting signal. The position indicator 1C transmits transmits identification information of additional information from the wireless communication circuit 42 to a wireless communication circuit 25C of the position detection system 2C.

As depicted in FIG. 12, the position detection system 2C is configured from a sensor 20C, a pen indication detection circuit 26C connected to the sensor 20C, and the wireless communication circuit 25C. In the present example, the sensor 20C has a configuration same as that of the sensor 20B of the position detection system 2B. Further, the pen indication detection circuit 26C has a configuration that is the same as that of the pen indication detection circuit 26B except the configuration of a band pass filter 223C and a control circuit 220C.

In the present example, the band pass filter 223C of the position indicator 1C of the configuration type 4 has a pass frequency band having the center frequency at the frequency f2. Further, the control circuit 220C has a function for detecting writing pressure information and side switch information to be sent together with a position detecting signal.

Figure 13:
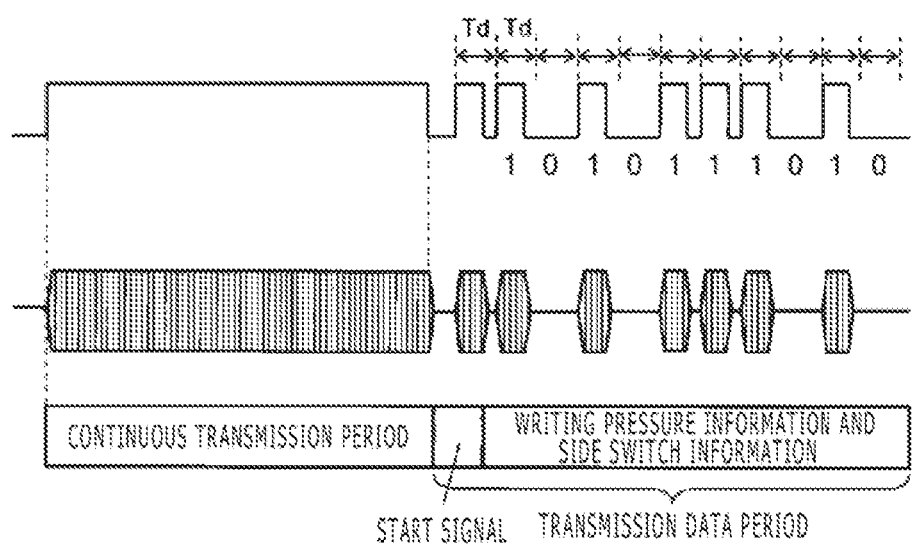
FIG. 13 is a timing chart illustrating the example of FIG. 12.

In the position indicator 1C of the configuration 4 of the present example, a center electrode transmission signal generation circuit 412 repetitively outputs a signal of a pattern in which one cycle is configured from a continuous transmission period and a transmission data period under the control of the control circuit 410. The upper portion of FIG. 13 depicts an example of a control signal supplied from the control circuit 410 of the position indicator 1C to the center electrode transmission signal generation circuit 412. The center electrode transmission signal generation circuit 412 successively transmits an oscillation signal of the frequency f2 as a burst signal as depicted in the middle portion of FIG. 13 within a fixed period within which a high level of the control signal of FIG. 13 is maintained (continuous transmission period in the lower portion of FIG. 13).

The length of the continuous transmission period is set to a time length within which an indication position on the sensor circuit 20C by the position indicator 1C can be detected by the pen indication detection circuit 26C of the position detection system 2C, and is set to a time length within which, for example, all of the first conductors 211Y and the second conductors 212X can be scanned by one or more times, preferably, by a plural number of times.

Within the continuous transmission period, the control circuit 410 of the position indicator 1C calculates a writing pressure applied to the center electrode 7 on the basis of the capacitance of the variable capacitor of the writing pressure detection circuit 9 and determines information of the calculated writing pressure value as a value of a plurality of bits (binary code). Further, the control circuit 410 generates on-off information of the side switch 43 as side switch information and as information of one bit or a plurality of bits.

Further, as depicted in the upper portion of FIG. 13, the control circuit 410 controls, after the continuous transmission period comes to an end, a control signal to the high level or the low level in a predetermined cycle (Td) within the transmission data period to perform ASK (Amplitude Shift Keying) modulation for the AC signal of the frequency f2. Alternatively, an OOK (On Off Keying) signal may be used in place of an ASK modulation signal.

At this time, within the first time predetermined cycle (Td) after the continuous transmission period, the control signal is controlled to the high level, and the control signal of the high level is used as a start signal in the lower portion of FIG. 13. The start signal is a timing signal used to make it possible for the pen indication detection circuit 26C of the position detection system 2C to accurately decide a later data transmission timing. It is to be noted that also a burst signal within the continuous transmission period can be utilized as a timing signal in place of the start signal.

The center electrode transmission signal generation circuit 412 of the position indicator 1C is controlled in such a manner as described above by the control circuit 410 to successively transmit, within the transmission data period, writing pressure information of a plurality of bits and side switch information of one or a plurality of bits following the start signal. In this case, as depicted in the upper and middle portions of FIG. 13, when transmission data (binary code) is "0," the control signal (upper portion of FIG. 13) is controlled to the low level such that transmission of an AC signal is not performed, but, when the transmission data (binary code) is "1," the control signal is controlled to the high level such that the AC signal is transmitted to perform ASK modulation.

In the pen indication detection circuit 26C of the position detection system 2C, the control circuit 220C detects a position indicated by the position indicator 1C from a reception signal within the continuous transmission period similarly as in the position detection system 2B described above. Further, the control circuit 220C waits until an end of the continuous transmission period and, if a start signal after the end of the continuous transmission period is detected, then the control circuit 220C detects and restores data of the writing pressure information and the side switch information within the transmission data period. Then, the control circuit 220C outputs the detection information of the indication position by the position indicator 1C, the writing pressure information and the side switch information to a host computer or the like together with the identification information received through the wireless communication circuit 25C.

It is to be noted that the position indicator 1C of the configuration type 4 may be configured similarly to the position indicator 1B of the configuration type 3 such that the frequency of the position detecting signal is switched so as to reduce the influence of noise. In this case, also the band pass filter 223C and the control circuit 220C of the position detection system 2C are configured so as to have functions similar to those of the band pass filter 223B and the control circuit 220B of the position detection system 2B compatible with the configuration type 3.

<Position Indicator 1D of Configuration Type 5 and Compatible Position Detection System 2D>

Figure 14:
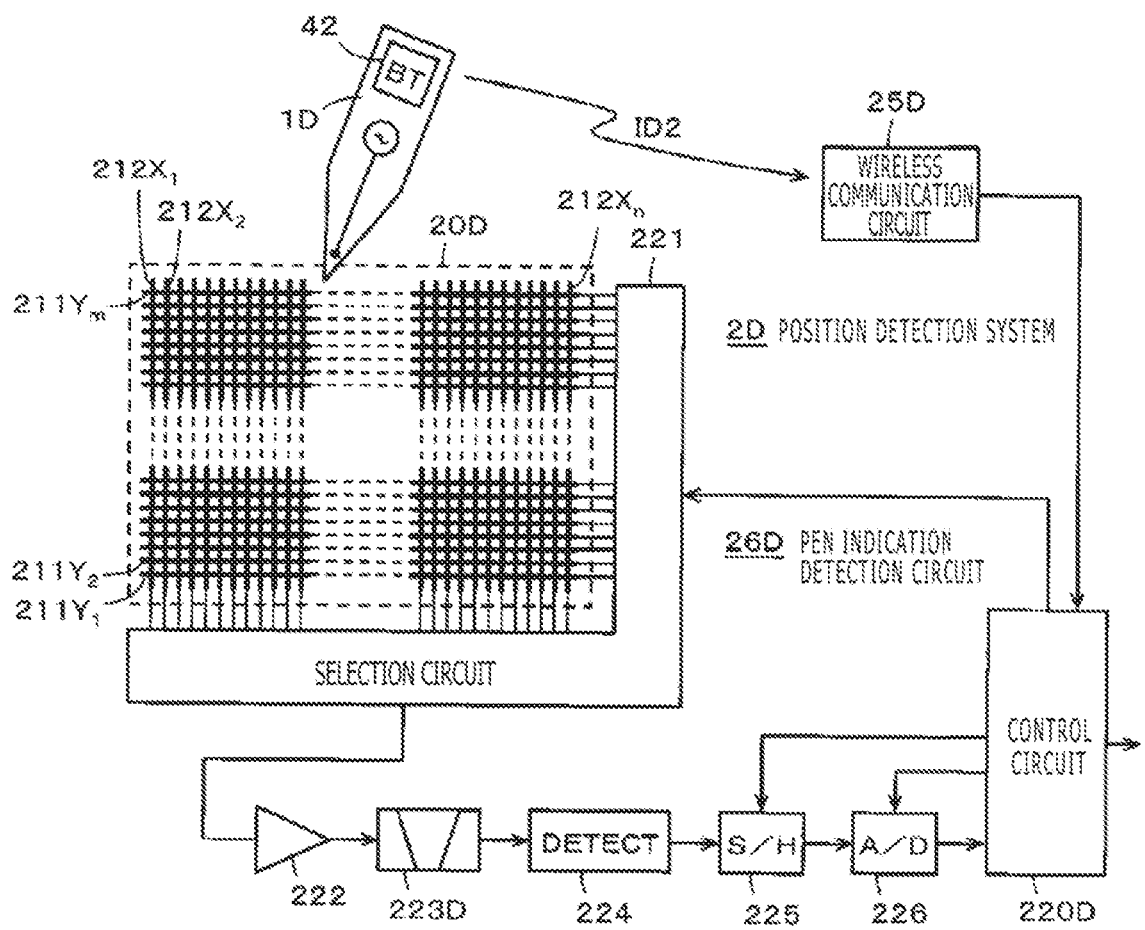
FIG. 14 is a view depicting a further example of the position indicator of a configuration type which can be configured from the embodiment of the position indicator according to an embodiment of the present disclosure and a compatible position detection system.

FIG. 14 is a view depicting an example of a circuit of a principal portion of a position indicator 1D of the configuration type 5 and a compatible position detection system 2D. The position indicator 1D of the configuration type 5 transmits transmits an AC signal of the frequency f2 as a position detecting signal and transmits transmits all additional information, in the present example, all of writing pressure information, side switch information and identification information ID1, to the position detection system 2D through the center electrode 7 together with a position detecting signal.

As depicted in FIG. 14, the position detection system 2D is configured from a sensor 20D, a pen indication detection circuit 26D connected to the sensor 20D, and a wireless communication circuit 25D. In the present example, the sensor 20D has a configuration that is the same as that of the sensor 20B of the position detection system 2B. Further, the pen indication detection circuit 26D has a configuration that is the same as that of the pen indication detection circuit 26C including a band pass filter 223D except a control circuit 220D. In particular, in the present example, the band pass filter 223D has a pass frequency band having a center frequency at the frequency f2. The control circuit 220D has a function for detecting the writing pressure information, side switch information and identification information ID1 sent thereto together with the position detecting signal.

Figure 15:
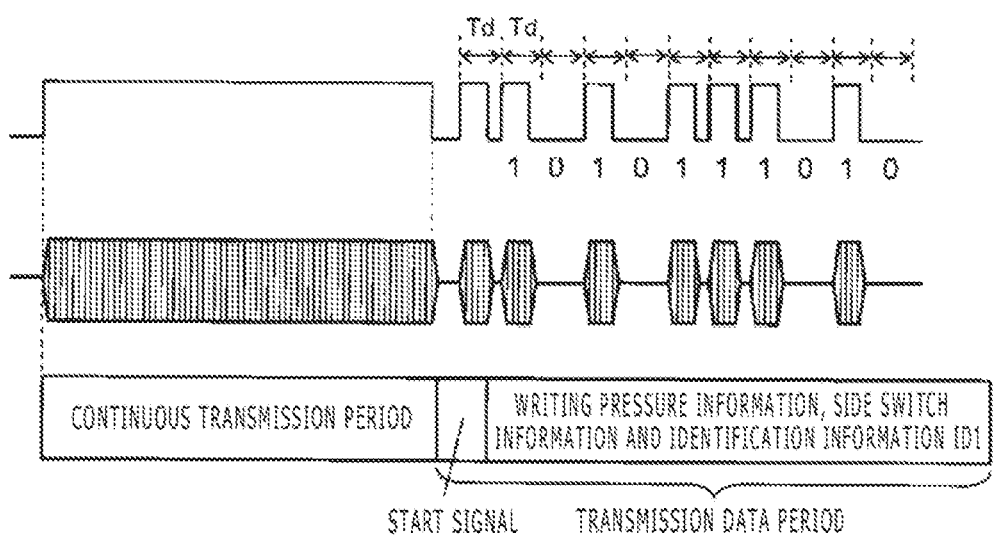
FIG. 15 is a timing chart illustrating the example of FIG. 14.

Also in the position indicator 1D of the configuration type 5 of the present example, the center electrode transmission signal generation circuit 412 is controlled by the control circuit 410 to repetitively output a signal of a pattern in which one cycle includes a continuous transmission period and a transmission data period as depicted in FIG. 15 similarly to the position indicator 1C of the configuration type 4.

The upper portion of FIG. 15 illustrates an example of a control signal supplied from the control circuit 410 of the position indicator 1D to the center electrode transmission signal generation circuit 412. The center electrode transmission signal generation circuit 412 of the position indicator 1D of the present example is controlled by the control signal of FIG. 15 to continuously transmit, within the continuous transmission period, an oscillation signal of the frequency f2 as a burst signal as illustrated in the middle portion of FIG. 15 but transmit, within the transmission data period, the writing pressure information, side switch information and identification information ID1 as an ASK signal to the position detection system 2D through the center electrode 7 as depicted in the middle and lower portions of FIG. 15.

The control circuit 220D of the position detection system 2D detects the position on the sensor circuit 20D indicated by the position indicator 1D on the basis of the burst signal within the continuous transmission period and detects and restores the writing pressure information, side switch information and identification information ID1 within the transmission data period.

Then, in the present example, in order to further secure exchange of signals between the position indicator 1D and the position detection system 2D, the position indicator 1D transmits transmits identification information ID2 from the wireless communication circuit 42 to the wireless communication circuit 25D of the position detection system 2D. In this case, the identification information ID1 and the identification information ID2 are made to be the same information (ID1=ID2). The control circuit 220D compares the identification information ID2 acquired through the wireless communication circuit 25D and the identification information ID1 received and detected through the center electrode 7 with each other and processes, only when they coincide with each other, the signal acquired from the position indicator 1D as a valid signal.

Then, when the control circuit 220D determines that the signal acquired from the position indicator 1D is a valid signal, the control circuit 220D outputs the detection information of the indication position by the position indicator 1D, writing pressure information, side switch information and identification information ID1 to the host computer or the like.

Figure 16:
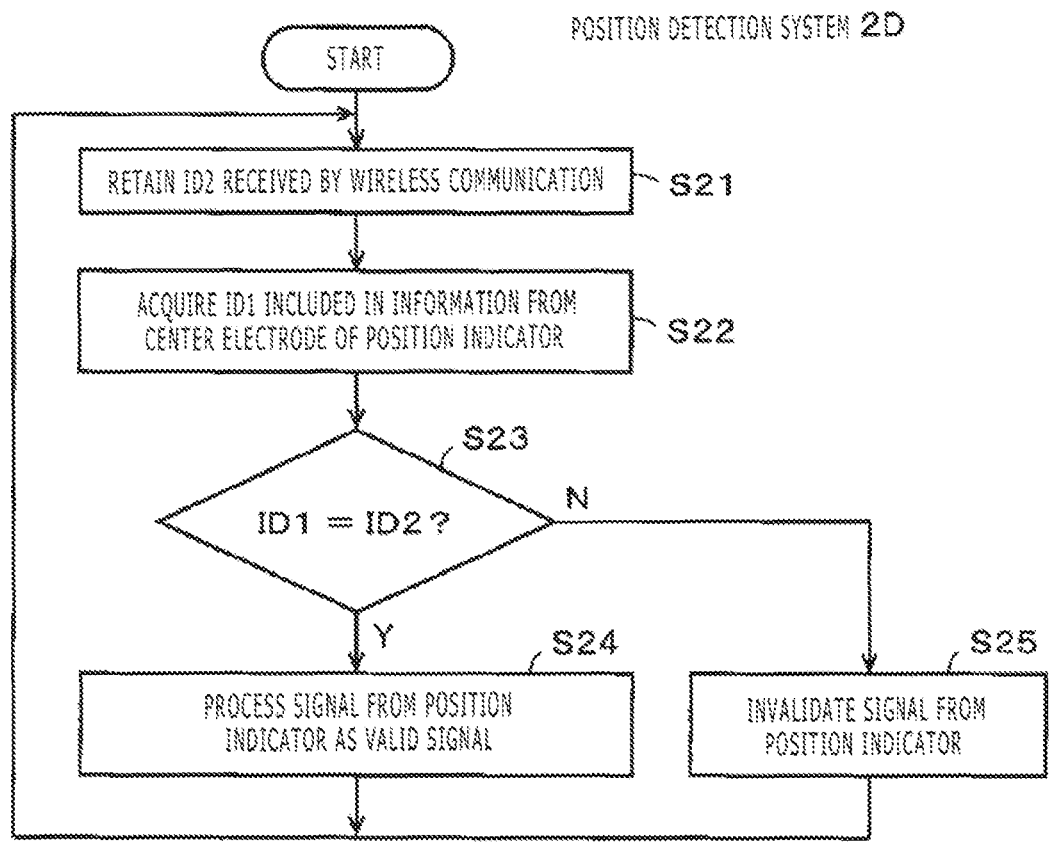
FIG. 16 is a view depicting a flow chart illustrating an example of a flow of processing operations of a position detection system compatible with a still further example of a position indicator of a configuration type which can be configured according to an embodiment of the present disclosure.

FIG. 16 is a flow chart illustrating a flow of a securing process of the control circuit 220D of the position detection system 2D in which the identification information ID1 and ID2 is used.

The control circuit 220D temporarily retains the identification information ID2 received through the wireless communication circuit 25D (S21). Then, the control circuit 220D acquires the identification information ID1 included in the information transmitted thereto through the center electrode 7 of the position indicator 1D (S22). Then, the control circuit 220D decides whether or not the identification information ID1 and the identification information ID2 coincide with each other (S23), and if it is decided that the identification information ID1 and the identification information ID2 coincide with each other, then it processes the signal from the position indicator 1D as a valid signal (S24). Thereafter, the control circuit 220D returns the processing to S21 and repeats the processing operations beginning at S21. On the other hand, if it is decided at S23 that the identification information ID1 and the identification information ID2 do not coincide with each other, then the control circuit 220D processes the signal from the position indicator 1D as an invalid signal (S25). Thereafter, the control circuit 220D returns the processing to S21 and repeats the processing operations beginning with step S21.

It is to be noted that the securing process which uses comparison between the identification information ID2 from the wireless communication circuit 42 and the identification information ID1 acquired through the center electrode 7 in the position detection system 2D is not an essentially required process but may not be performed.

[Other Embodiments9

<Other Examples of Capacitive Coupling Scheme>

The plurality of configuration types of the position indicator described above are mere examples, and it is a matter of course that the configuration type of the position indicator is not limited to those described above. For example, while the position indicator of the active scheme described above transmits transmits a signal only from the center electrode 7, a position indicator configured such that, in order to make it possible to detect an inclination angle or a rotational angle of the position indicator on the position detection system, the peripheral electrode 6 is divided into a plurality of divisional peripheral electrodes such that each of the plurality of divisional peripheral electrodes transmits transmits a signal for making it possible to identify the divisional peripheral electrodes from each other may be used as a position indicator of one configuration type.

Figure 17A:
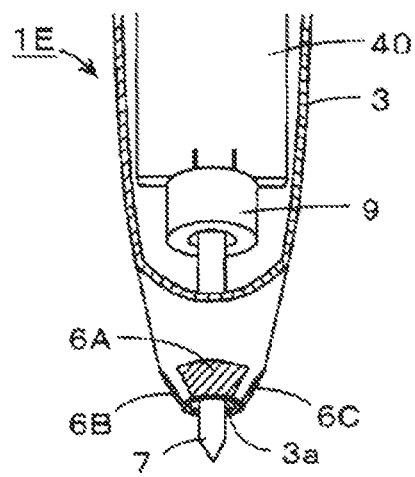
FIGS. 17A and 17B are views illustrating a yet further example of a position indicator of a configuration type which can be configured according to an embodiment of the present disclosure.
Figure 17B:
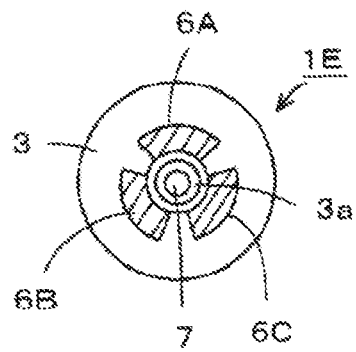

FIGS. 17A and 17B are views depicting parts of a position indicator 1E which can configure also a position indicator of such a configuration type as just above, and FIG. 17A is a view illustrating components of the center electrode 7 side and FIG. 17B is a view when the position indicator 1E is viewed in an axial direction from the distal end side of the center electrode 7.

In the present position indicator 1E, a peripheral electrode configured from a conductor provided around an opening 3a of a housing 3 in which the center electrode 7 is inserted is provided as three divided peripheral electrodes 6A, 6B and 6C. The divided peripheral electrodes 6A, 6B and 6C are provided in an electrically isolated and separated relationship from each other as depicted in FIGS. 17A and 17B.

Further, in the case of the configuration type 1 of the passive scheme and the configuration types 3, 4 and 5 of the active scheme described hereinabove, the divided peripheral electrodes 6A, 6B and 6C are not used. In the case of the configuration type 2 of the improved type of the passive scheme, the divided peripheral electrodes 6A, 6B and 6C are configured such that they are electrically connected to each other and signals received by all of the divided peripheral electrodes 6A, 6B and 6C are synthesized and supplied to the feedback signal generation circuit 415.

Further, where a position indicator of a configuration type whose inclination angle or rotational angle on a position detection system can be detected is configured from the position indicator 1E, the position indicator is configured such that a position detecting signal and additional information selected in response to a configuration type are transmitted from the center electrode 7 while signals from which the divided peripheral electrodes 6A, 6B and 6C can individually be detected by the position detection system are transmitted from the divided peripheral electrodes 6A, 6B and 6C.

For example, the position indicator is configured such that, from each of the divided peripheral electrodes 6A, 6B and 6C, identification information (for example, a signal of 2 bits) corresponding to each of the divided peripheral electrodes 6A, 6B and 6C is transmitted or such that signals of frequencies or phases different from one another are transmitted from the divided peripheral electrodes 6A, 6B and 6C. Alternatively, the position indicator is configured such that, after transmission of a signal from the center electrode 7 comes to an end, a signal of one frequency is transmitted in order from the divided peripheral electrodes 6A, 6B and 6C for each predetermined period.

A position detection system compatible with a position indicator of a configuration type in which the inclination angle or rotational angle of the position indicator on the position detection system can be detected has a function for detecting a rotational angle or an inclination angle of the position indicator 1E from a reception intensity of a signal from each of the divided peripheral electrodes 6A, 6B and 6C or a spreading distribution pattern of a reception signal.

<Example of Electromagnetic Coupling Scheme>

Further, while the embodiment described above is directed to a position indicator and a position detection system of the capacitive coupling scheme, the present disclosure can be applied also to a position indicator and a position detection system of the electromagnetic coupling scheme.

Figure 18:
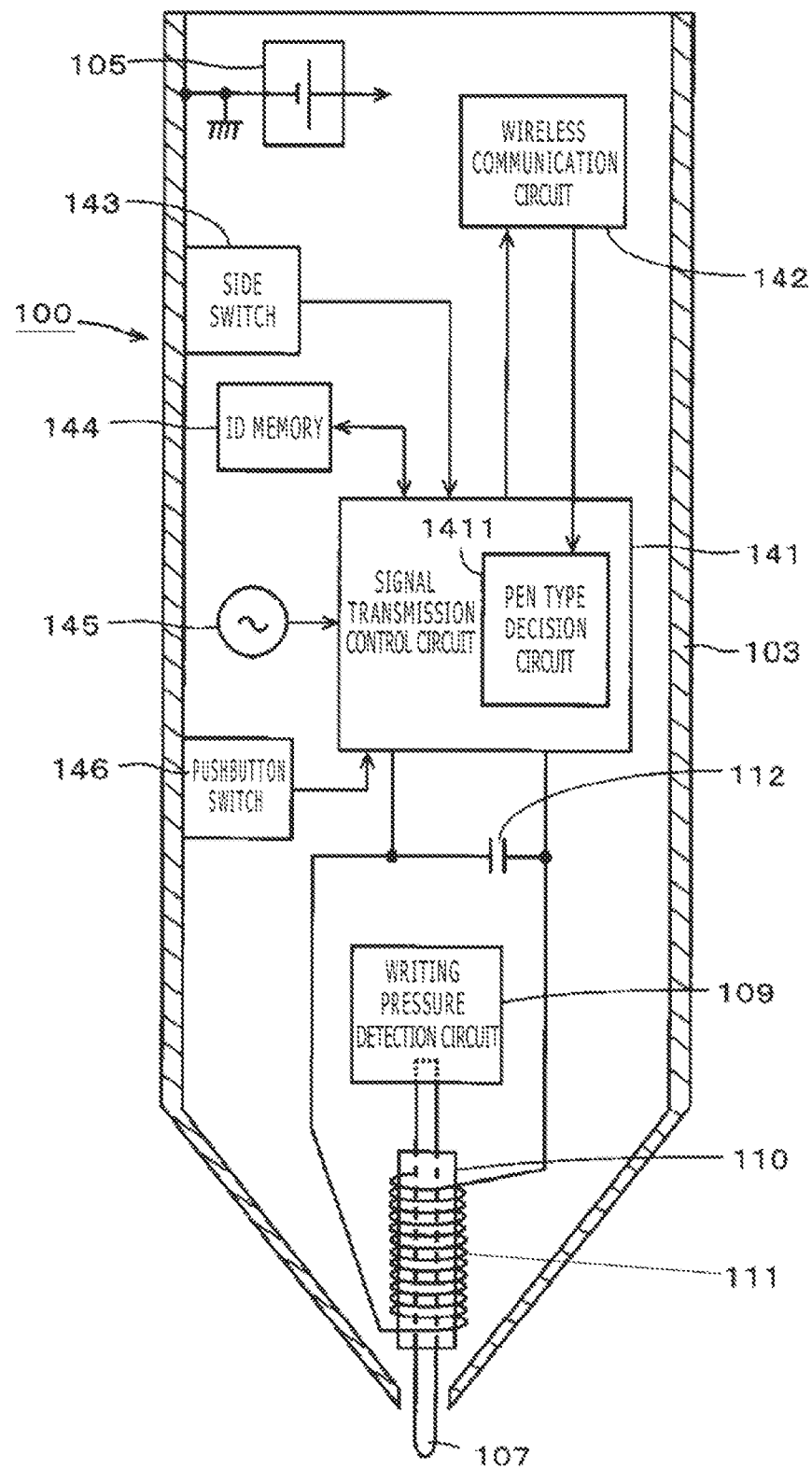
FIG. 18 is a view depicting a conceptual configuration of a position indicator according to an embodiment of the present disclosure.

FIG. 18 depicts an example of a configuration of a position indicator 100 of the electromagnetic coupling scheme according to the present disclosure and corresponds to the view of the conceptual configuration of FIG. 1 which depicts the position indicator 1 of the embodiment described hereinabove.

As depicted in FIG. 18, the position indicator 100 of the present embodiment includes a signal transmission control circuit 141, a wireless communication circuit 142, a side switch 143, an ID memory 144 and an oscillator 145 in a tubular housing 103 made of an insulator such as a resin and further includes a writing pressure detection circuit 109. Further, a battery 105 is provided as a supply source of a power supply voltage to the signal transmission control circuit 141, wireless communication circuit 142, side switch 143, ID memory 144, oscillator 145 and so forth in the housing 103. The signal transmission control circuit 141 includes a pen type decision circuit 1411.

Further, a core member 107 extending through a ferrite core 110 is coupled to the writing pressure detection circuit 109 such that the writing pressure detection circuit 109 detects a writing pressure applied to the core member 107 as a capacitance of a variable capacitor configured from the writing pressure detection circuit 109. The ferrite core 110 has a coil 111 wound thereon, and the coil 111 is connected at the opposite ends thereof to the signal transmission control circuit 141. Further, a capacitor 112 cooperating with the coil 111 to configure a resonance circuit is connected between the opposite ends of the coil 111.

To the signal transmission control circuit 141, the wireless communication circuit 142, side switch 143, ID memory 144 and oscillator 145 are connected similarly as in the position indicator 1 of the embodiment described above, and also the variable capacitor configured from the writing pressure detection circuit 109 is connected to the signal transmission control circuit 141.

The signal transmission control circuit 141 selectively controls, in the present position indicator 100, a signal to be transmitted through the resonance circuit including the coil 111 and the capacitor 112 and selectively controls whether additional information such as writing pressure information, side switch information and identification information is to be transmitted from the wireless communication circuit 142 or transmitted as a signal from the resonance circuit.

In particular, in the case of the position indicator 100 of the present embodiment, the resonance circuit configures a first transmission circuit (first transmitter) and a transmission circuit of the wireless communication circuit 142 configures a second transmission circuit (second transmitter). Further, a reception circuit of the wireless communication circuit 142 configures a reception circuit (receiver) which receives pen type information from the position detection system. Pen type information received from the position detection system by the reception circuit of the wireless communication circuit 142 is supplied to the pen type decision circuit 1411 of the signal transmission control circuit 141. Though not depicted, also in the present embodiment, the pen type decision circuit 1411 can be configured from a decision processing circuit of a pen type and a pen type table memory.

Figure 19A:
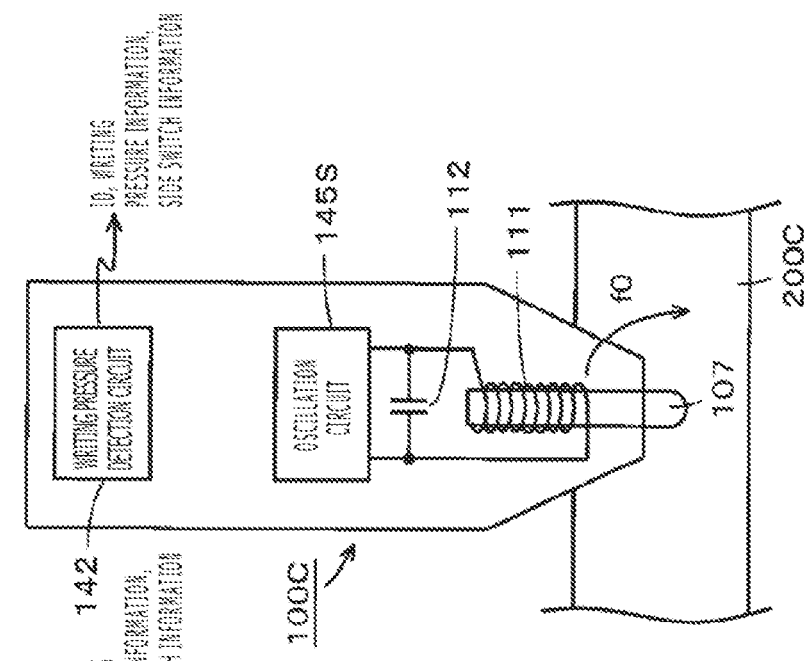
FIGS. 19A, 19B, and 19C are views depicting an example of a position indicator of a configuration type which can be configured according to an embodiment of the present disclosure.
Figure 19B:
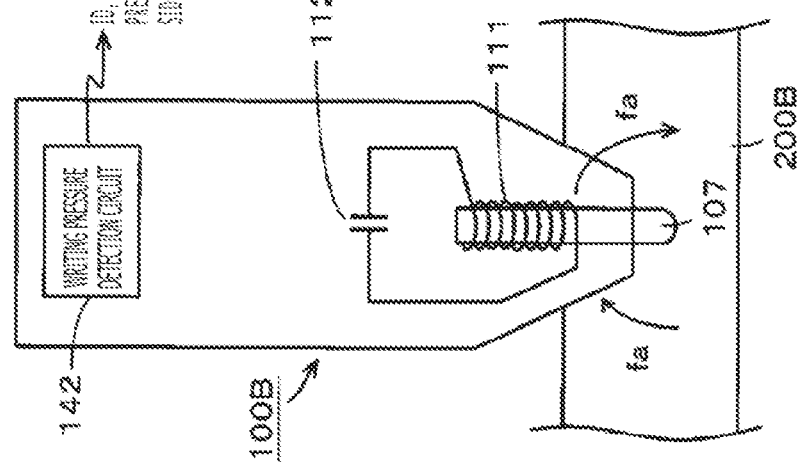
Figure 19C:
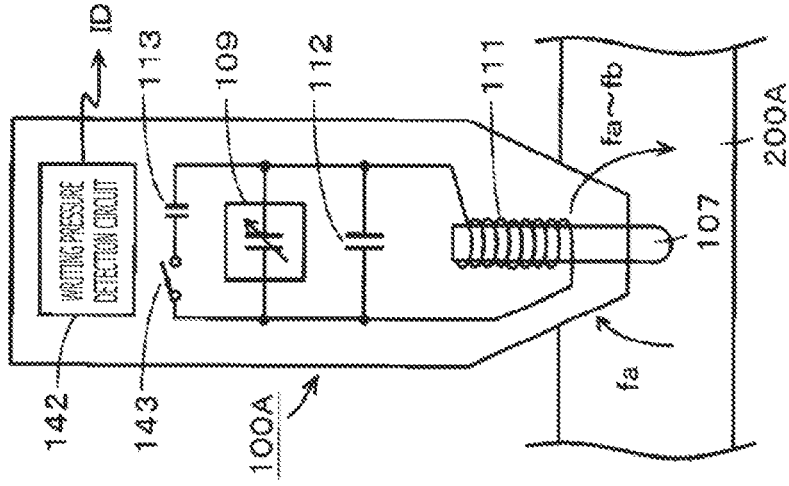

The signal transmission control circuit 141 of the position indicator 100 of the present embodiment receives pen type information from the position detection system, and the pen type decision circuit 1411 decides and determines a pen type and can configure, for example, such position indicators 100A, 100B and 100C of three different configuration types 6, 7 and 8 as depicted in FIGS. 19A, 19B and 19C, respectively.

If pen type information received from the position detection system through the reception circuit of the wireless communication circuit 142 of the position indicator 100 is the configuration type 6, then such a position indicator 100A as depicted in FIG. 19A is configured by the signal transmission control circuit 141. In particular, in the present configuration type 6, a variable capacitor configured from the writing pressure detection circuit 109 is connected in parallel to the parallel resonance circuit configured from the coil 111 and the capacitor 112, and further, a series circuit of the side switch 143 and a capacitor 113 is connected to the resonance circuit.

Further, the sensor circuit of a position detection system 200A which is used together with the position indicator 100A of the configuration type 6 and sends the configuration type 6 as pen type information to the position indicator 100A is configured, though not depicted, such that pluralities of loop coils are arrayed in an X direction and a Y direction which are orthogonal to each other such that a transmission signal (AC signal) of a frequency fa is transmitted from a loop coil to the position indicator 100A.

In the position indicator 100A, an AC signal from the position detection system 200A is received by the resonance circuit through electromagnetic coupling and then the AC signal is fed back from the resonance circuit to the position detection system 200A. In the position detection system 200A, the position indicated by the position indicator 100A is detected from the position of the loop coil from which the AC signal is transmitted and the position of the loop coil which receives the feedback signal from the position indicator 100A.

In this case, since the feedback signal from the position indicator 100A varies in response to variation of the resonance frequency of the resonance circuit depending upon the value of the capacitance of the variable capacitor configured from the writing pressure detection circuit 109, the position detection system 200A detects the writing pressure information from the variation of the frequency (or variation of the phase).

Further, since the capacitor 113 is placed into a connection state or a disconnection state with respect to the resonance circuit in response to switching on or off of the side switch 143, the resonance frequency of the resonance circuit varies in response to switching on and off of the side switch 143. The position detection system 200A detects side switch information according to switching on and off of the side switch 143 from a variation of the frequency (or a variation of the phase) of the feedback signal from the position indicator 100A.

It is to be noted that, in the position indicator 100A of the configuration type 6, identification information is transmitted to the wireless communication circuit of the position detection system 200A through the transmission circuit of the wireless communication circuit 142.

If the pen type information received from the position detection system through the reception circuit of the wireless communication circuit 142 of the position indicator 100 is the configuration type 7, then such a position indicator 100B as depicted in FIG. 19B is configured by the signal transmission control circuit 141. In particular, in the present configuration type 7, the parallel resonance circuit is configured from the coil 111 and the capacitor 112. Further, the writing pressure information, side switch information and identification information are all transmitted to the wireless communication circuit of a position detection system 200B through the transmission circuit of the wireless communication circuit 142.

The sensor of the position detection system 200B which is used together with the position indicator 100B of the configuration type 7 and sends the configuration type 7 as pen type information to the position indicator 100B has a same configuration as that of the sensor of the position detection system 200A and transmits a transmission signal (AC signal) of the frequency fa from a loop coil to the position indicator 100B.

In the position indicator 100B, an AC signal from the position detection system 200B is received by the resonance circuit through electromagnetic coupling and then the AC signal is fed back from the resonance circuit to the position detection system 200B similarly to the position indicator 100A. In the position detection system 200B, a position indicated by the position indicator 100B is detected similarly as in the position detection system 200A.

The position detection system 200B of this configuration type 7 does not have a function for monitoring a variation of a frequency or a phase of a feedback signal to detect additional information. Further, the position detection system 200B decodes additional information received through the wireless communication circuit to acquire writing pressure information, side switch information and identification information.

If the pen type information received from the position detection system through the reception circuit of the wireless communication circuit 142 of the position indicator 100 is the configuration type 8, then such a position indicator 100C as depicted in FIG. 19C is configured by the signal transmission control circuit 141. In particular, in the position indicator 100C of the configuration type 8, the parallel resonance circuit configured from the coil 111 and the capacitor 112 is coupled to the oscillator 145 to configure an oscillation circuit 145S. Thus, an oscillation signal from the oscillation circuit 145S is transmitted to a position detection system 200C through the parallel resonance circuit configured from the coil 111 and the capacitor 112.

Further, the writing pressure information, side switch information and identification information are all transmitted to the wireless communication circuit of the position detection system 200C through the transmission circuit of the wireless communication circuit 142.

Further, the sensor of the position detection system 200C which is used together with the position indicator 100C of the configuration type 8 and sends the configuration type 8 as the pen type information to the position indicator 100C is configured such that, though not depicted, pluralities of loop coils are arrayed in an X direction and a Y direction orthogonal to each other.

Further, the position detection system 200C receives an AC signal transmitted from the position indicator 100C by a loop coil through electromagnetic coupling. Then, the position detection system 200C detects the position indicated by the position indicator 100C from the positions in the X direction and the Y direction of the loop coil by which the AC signal is received.

It is to be noted that also the configuration types 6 to 8 described above are examples, and various other configuration types are available for a position indicator and a position detection system of the electromagnetic coupling scheme, and it is a matter of course that the position indicator of the present disclosure can be configured so as to be compatible with the various configuration types. For example, while, in the examples of the configurations types 6 to 8 described above, identification information is not transmitted through the resonance circuit, a different configuration type may be used such that identification information is transmitted as an ASK modulation signal or an OOK signal from the core member 107 side by controlling switching on and off of a resonance action of the resonance circuit or an oscillation action of the oscillation circuit 145S.

[Other Embodiments or Modifications]

Although the writing pressure detection circuits 9 and 109 of the embodiments described above are configured such that they use a variable capacitor whose capacitance is variable in response to a writing pressure by sandwiching a dielectric member between a first electrode and a second electrode and making one of the first electrode and the second electrode movable in an axial direction in response to the writing pressure, the writing pressure detection circuit is not limited to this configuration. Also, it is possible to configure the writing pressure detection circuit 9 using such a semiconductor element whose capacitance is variable in response to a writing pressure as disclosed, for example, in Japanese Patent Laid-Open No. 2013-161307. Alternatively, the writing pressure detection circuit may be configured by using a structure or an element having not a capacitance but an inductance value or a resistance value which is variable in response to the writing pressure.

Further, the additional information is not limited to any of writing pressure information, side switch information and identification information as described hereinabove, but other various types of information such as remaining amount information of a battery may be used as the additional information.

Further, while, in the foregoing description of the embodiments, the driving power supply for the position indicator is a battery, a capacitor for accumulating a power supply voltage may be provided in the position indicator such that the capacitor may be used as a driving power supply. In this case, the configuration for accumulating a power supply voltage in the capacitor may be a configuration of a charging circuit which receives electric energy from the outside through electromagnetic induction or electric field coupling to perform charging or may be a configuration wherein a charging terminal is further provided on the position indicator such that charging current is supplied from a charging apparatus for exclusive use through the charging terminal. Then, the electric energy (electromagnetic energy or electric field energy) from the outside may be supplied from the position detection apparatus to the position indicator or may be supplied from a power supplying apparatus for exclusive use.

Further, while, in the embodiments described hereinabove, the position indicator includes two transmitters including a center electrode and a wireless communication circuit, it may include three or more transmitters.

It is to be noted that, in the description of the position indicator of each of the embodiments described hereinabove, by moving the position indicator close to the sensor of the position detection system, the position indicator is automatically placed into that of a configuration type compatible with the position detection system. However, not by the position detection system but the position indicator may be configured such that, by communicating with an external apparatus such as a personal computer which is communicatable with the wireless communication circuit of the position indicator and selecting a configuration type through the external apparatus such as a personal computer, the position indicator can be set to that of the selected desired configuration type.

Alternatively, the position indicator may be configured such that it includes a switch for switchable setting of a configuration type such that the position indicator can be set to that of a desired configuration type by a switching operation by the switch for the switchable setting. In particular, for example, the example of FIG. 18 is configured such that a pushbutton switch 146 which can be manually operated by the user is provided on the housing 103 such that a depression operation signal of the pushbutton switch 146 is supplied to the signal transmission control circuit 141. In this case, every time the pushbutton switch 146 is depressed, for example, by the user, the signal transmission control circuit 141 performs control so as to change the configuration type. It is to be noted that, also in the example of FIG. 1, a pushbutton switch may naturally be provided similarly.

DESCRIPTION OF REFERENCE SYMBOLS 1, 1A to 1E, 100A to 100C . . . Position indicator,
2, 2A to 2D, 200A to 200C . . . Position detection system,
3 . . . Housing,
31 . . . Insulator portion,
32 . . . Conductor portion,
5 . . . Battery,
6 . . . Peripheral electrode,
7 . . . Center electrode,
8 . . . Shield member,
9 . . . Writing pressure detection circuit,
40 . . . Printed wiring board,
41 . . . Signal transmission control circuit,
42 . . . Wireless communication circuit,
43 . . . Side switch,
44 . . . ID memory,
45, 46 . . . Oscillator,
48 . . . Power supply switch,
410 . . . Control circuit,
411 . . . Pen type decision circuit

The invention claimed is:

1. A position indicator, comprising:
    a pen-shaped body;
    control circuitry housed in the pen-shaped body and configured to:
        generate position detection signals, and
        generate additional information about the position indicator;
    a first receiver;
    a second receiver different from the first receiver;
    a first transmitter provided near a distal end of the pen-shaped body and configured to transmit the position detection signals or the additional information to a sensor of a position detection system; and
    a second transmitter, which is different from the first transmitter and configured to transmit wireless signals to the position detection system;
    wherein the control circuitry, in response to a control signal from the position detection system received by the first receiver or the second receiver, controls transmission of the additional information via a transmitter selected from the first transmitter and the second transmitter, to the position detection system.

2. The position indicator according to claim 1, wherein the control circuitry, in operation, controls whether the control signal from the position detection system is received by the first receiver or by the second receiver.

3. The position indicator according to claim 1, comprising:
    a center electrode extending along an axis of the pen-shaped body to protrude from the distal end of the pen-shaped body; and
    a peripheral electrode disposed adjacent to the center electrode;
    wherein the control circuitry controls the first receiver to receive, via the center electrode or the peripheral electrode, the control signal from the position detection system.

4. The position indicator according to claim 3, wherein the control circuitry, in response to the control signal received via the center electrode or the peripheral electrode, controls the transmission of the additional information via the second transmitter to the position detection system.

5. The position indicator according to claim 1, comprising:
    a center electrode extending along an axis of the pen-shaped body to protrude from the distal end of the pen-shaped body; and
    a peripheral electrode disposed adjacent to the center electrode;
    wherein the control circuitry controls the second receiver to receive the control signal from the position detection system, and controls the first transmitter to transmit the additional information via the center electrode or the peripheral electrode to the position detection system.

6. The position indicator according to claim 1, wherein the control circuitry controls the second receiver to receive the control signal from the position detection system, and controls the second transmitter to transmit the additional information to the position detection system.

7. The position indicator according to claim 1, comprising:
    a center electrode extending along an axis of the pen-shaped body to protrude from the distal end of the pen-shaped body; and
    a pressure detection circuit configured to detect a pressure applied to the center electrode;
    wherein the additional information indicates the pressure detected by the pressure detection circuit.

8. The position indicator according to claim 1, comprising:
    an identification (ID) memory device configured to store an ID of the position indicator;
    wherein the additional information indicates the ID of the position indicator.

9. The position indicator according to claim 1, comprising:
    an operable switch;
    wherein the additional information indicates an operational state of the switch.

10. The position indicator according to claim 1, wherein the first receiver, in operation, receives the control signal transmitted via the sensor of the position detection system.

11. The position indicator according to claim 1, wherein the first receiver, in operation, receives the control signal based on a spread code transmitted via the sensor of the position detection system.

12. The position indicator according to claim 1, wherein the second receiver, in operation, receives a wireless signal transmitted from the position detection system.

13. The position indicator according to claim 1, wherein the first transmitter, in operation, transmits the position detection signals to the sensor of the position detection system via a capacitive coupling between the first transmitter and the sensor.

14. The position indicator according to claim 1, wherein the first transmitter, in operation, transmits the position detection signals to the sensor of the position detection system via an electromagnetic coupling between the first transmitter and the sensor.

15. The position indicator according to claim 1, wherein:
    the second receiver, in operation, receives a wireless signal transmitted from the position detection system, and
    the second receiver and the second transmitter form a short-distance wireless communication system.

16. The position indicator according to claim 15, wherein the short-distance wireless communication system is a Bluetooth® system.

17. The position indicator according to claim 1, wherein the control circuitry, in response to the control signal from the position detection system not received by the first receiver or the second receiver for a defined time period, deactivates the first transmitter or the second transmitter selected for the transmission of the additional information.

18. A position indicator, comprising:
    a pen-shaped body;
    control circuitry housed in the pen-shaped body and configured to:
        generate position detection signals, and
        generate additional information about the position indicator;
    a first receiver configured to receive a control signal from a position detection system via a sensor of the position detection system;
    a second receiver different from the first receiver and configured to receive the control signal from the position detection system;
    a first transmitter provided near a distal end of the pen-shaped body and configured to transmit signals to the sensor of the position detection system; and
    a second transmitter, which is different from the first transmitter and configured to transmit wireless signals to the position detection system;

wherein the control circuitry, in response to the control signal transmitted via the sensor of the position detection system and received by the first receiver, controls transmission of the additional information via a transmitter selected from the first transmitter and the second transmitter; and wherein the first transmitter includes a center electrode, which extends along an axis of the pen-shaped body to protrude from the distal end of the pen-shaped body, and a peripheral electrode, which is disposed adjacent to the center electrode, and the control circuitry, in response to the control signal transmitted via the sensor of the position detection system and received by the first receiver, controls transmission of the position detection signals via the center electrode and transmission of the position detection signals via the peripheral electrode.

19. The position indicator according to claim 18, wherein signals transmitted via the center electrode and signals transmitted via the peripheral electrode are configured to be distinguishable by the position detection system.

20. The position indicator according to claim 19, wherein the signals transmitted via the center electrode and the signals transmitted via the peripheral electrode are transmitted at different times to be distinguishable by the position detection system.

21. The position indicator according to claim 18, wherein the peripheral electrode is divided into multiple segments, and the position detection signals are transmitted from the multiple segments so that the multiple segments are detectable by the position detection system.

22. The position indicator according to claim 21, wherein the position detection signals of different frequencies or different phases are transmitted from different ones of the multiple segments.

23. The position indicator according to claim 21, wherein different identification information are transmitted from different ones of the multiple segments.

24. The position indicator according to claim 21, wherein the position detection signals are transmitted from different ones of the multiple segments at different times.

25. A position indicator, comprising:
a pen-shaped body;
control circuitry housed in the pen-shaped body and configured to:
  generate position detection signals, and
  generate additional information about the position indicator;
a first receiver configured to receive a control signal from a position detection system via a sensor of the position detection system;
a second receiver different from the first receiver and configured to receive the control signal from the position detection system;
a first transmitter provided near a distal end of the pen-shaped body and configured to transmit signals to the a sensor of a position detection system; and
a second transmitter, which is different from the first transmitter and configured to transmit wireless signals to the position detection system;
wherein the control circuitry, in response to the control signal transmitted from the position detection system and received by the second receiver, controls transmission of the additional information via a transmitter selected from the first transmitter and the second transmitter; and
wherein the first transmitter includes a center electrode, which extends along an axis of the pen-shaped body to protrude from the distal end of the pen-shaped body, and a peripheral electrode, which is disposed adjacent to the center electrode, and the control circuitry, in response to the control signal transmitted from the position detection system and received by the second receiver, controls transmission of the position detection signals via the center electrode and transmission of the position detection signals via the peripheral electrode.

26. The position indicator according to claim 25, wherein signals transmitted via the center electrode and signals transmitted via the peripheral electrode are configured to be distinguishable by the position detection system.

27. The position indicator according to claim 26, wherein the signals transmitted via the center electrode and the signals transmitted via the peripheral electrode are transmitted at different times to be distinguishable by the position detection system.

28. The position indicator according to claim 25, wherein the peripheral electrode is divided into multiple segments, and the position detection signals are transmitted from the multiple segments so that the multiple segments are detectable by the position detection system.

29. The position indicator according to claim 28, wherein the position detection signals of different frequencies or different phases are transmitted from different ones of the multiple segments.

30. The position indicator according to claim 28, wherein different identification information are transmitted from different ones of the multiple segments.

31. The position indicator according to claim 28, wherein the position detection signals are transmitted from different ones of the multiple segments at different times.

* * * * *